United States Patent
Pettit et al.

(10) Patent No.: US 12,113,814 B2
(45) Date of Patent: Oct. 8, 2024

(54) USER DEVICE AGENT EVENT DETECTION AND RECOVERY

(71) Applicant: Kandji, Inc., San Diego, CA (US)

(72) Inventors: Adam Pettit, San Diego, CA (US);
Wesley Pettit, San Diego, CA (US);
Mark Daughters, San Diego, CA (US);
Brandon Modesitt, Encinitas, CA (US)

(73) Assignee: Kandji, Inc., San Diego, CA (US)

( * ) Notice: Subject to any disclaimer, the term of this patent is extended or adjusted under 35 U.S.C. 154(b) by 0 days.

(21) Appl. No.: 18/520,806

(22) Filed: Nov. 28, 2023

(65) Prior Publication Data

US 2024/0187427 A1    Jun. 6, 2024

Related U.S. Application Data

(60) Provisional application No. 63/385,734, filed on Dec. 1, 2022.

(51) Int. Cl.
    *H04L 9/40* (2022.01)
(52) U.S. Cl.
    CPC ........ *H04L 63/1416* (2013.01); *H04L 63/145* (2013.01)
(58) Field of Classification Search
    CPC .................. H04L 63/1416; H04L 63/145
    USPC .......................................................... 726/22
    See application file for complete search history.

(56) References Cited

U.S. PATENT DOCUMENTS

| | | | |
|---|---|---|---|
| 11,397,808 B1* | 7/2022 | Prabhu | G06F 21/566 |
| 2016/0378824 A1* | 12/2016 | Li | G06F 16/24532 707/715 |
| 2019/0034507 A1* | 1/2019 | Duttagupta | G06F 16/1752 |
| 2019/0294789 A1* | 9/2019 | Permeh | G06N 5/04 |
| 2021/0117442 A1* | 4/2021 | Lai | G06F 3/065 |
| 2021/0176261 A1* | 6/2021 | Yavo | G06N 20/00 |
| 2021/0294896 A1* | 9/2021 | Murphy | G06F 21/566 |
| 2022/0318377 A1* | 10/2022 | Edwards | G06F 21/52 |

OTHER PUBLICATIONS

International Search Report and Written Opinion dated Mar. 6, 2024 for PCT Patent Application No. PCT/IB2023/061981.

* cited by examiner

*Primary Examiner* — Badri Narayanan Champakesan
(74) *Attorney, Agent, or Firm* — MLO, a professional corp.

(57) ABSTRACT

A method involves receiving a plurality of security rules from a remote management platform at an endpoint detection and response (EDR) module at a user device. The EDR module subscribes to one or more event types at the user device. The EDR module receives a notification of an event corresponding to one of the subscribed event types. Upon determining that the event is associated with a file stored at the user device, the EDR module instantiates an event tracer tree that is associated with the file. The EDR module generates a file hash value for the file using the event tracer tree. Upon determining that the file hash value satisfies a security rule, the EDR module quarantines the file and reports that the file has been quarantined.

18 Claims, 30 Drawing Sheets

600

1015

2600

USER DEVICE AGENT EVENT DETECTION AND RECOVERY

RELATED APPLICATIONS

This application claims priority to U.S. Provisional Patent Application No. 63/385,734, filed Dec. 1, 2022, all of which is incorporated herein in its entirety.

BACKGROUND

Security policies that govern the behavior of user devices within a network vary by different enterprises, vary within different areas of an enterprise, and can vary for different user devices. Such user devices are generally computing devices and include desktop computers, laptop computers, tablet computers, and smartphones.

Instituting different security policies in addition to ensuring compliance with those policies for each user device within an enterprise may be a difficult and costly task. Some enterprises may allocate finite IT resources to build security software and maintain it over time. However, for enterprises with different policies for different user devices, the effort and cost of developing security software can multiply with the number of policies, which further impacts the feasibility of relying on internal resources to build and maintain security software. Creating and maintaining internal software of any kind can require regular testing to ensure that it functions as intended, which would be a further strain on finite resources.

Some common enterprise security policies involve restricting which applications a user is permitted to execute on their user device as well as restricting which modifications that a user is permitted to make at their user device. Additionally, some common enterprise security policies involve regularly scanning a user device for applications or files that may have been installed unbeknownst to the user (e.g., computer malware and/or computer viruses).

Managing user security compliance may add significant workload and help-ticket requests to an already overburdened IT department. Therefore, some organizations employ endpoint detection and response (EDR) software applications to automatically mitigate security threats at user devices. EDR technology encompasses a collection of modules that detect and address suspicious activity at a user device. However, some EDR modules may degrade the performance of the user device due to resource-intensive background operations at the user device.

SUMMARY

In some aspects, the techniques described herein relate to a method, including: receiving, from a remote management platform, a plurality of security rules at an endpoint detection and response (EDR) module at a user device; subscribing, by the EDR module, to one or more event types at the user device; receiving, at the EDR module, a notification of an event corresponding to one of the subscribed event types; upon determining, by the EDR module, that the event is associated with a file stored at the user device, instantiating, by an event tracer module, an event tracer tree that is associated with the file; generating, by the EDR module, a file hash value for the file using the event tracer tree; upon determining, by the EDR module, that the file hash value satisfies a security rule, quarantining the file; and reporting to a management platform that the file has been quarantined.

In some aspects, the techniques described herein relate to a method, including: receiving, at an endpoint detection and response (EDR) module at a user device, a notification of an event at the user device; upon determining, by the EDR module, that the event is associated with a file stored at the user device, instantiating, by an event tracer module, an event tracer tree that is associated with the file; generating, by the EDR module, a file hash value for the file using the event tracer tree; and upon determining, by the EDR module, that the file hash value satisfies a security rule, quarantining the file.

DETAILED DESCRIPTION

In some embodiments, an endpoint detection and response (EDR) module is disclosed that advantageously detects and mitigates potential security risks at a user device, without unduly impacting the performance of the user device, using configuration parameters that are specified at a remote management platform. Such user devices include desktop computers, laptop computers, tablet computers, and smartphones, among other computing devices or compute nodes. One technical benefit of the EDR module disclosed herein is continuous or continual detection and remediation of potential security risks at user devices without degrading user device performance during file system scanning, thereby improving the performance of the user device as compared to conventional solutions.

The EDR module advantageously creates a sequential file reading thread pool at the user device to read one or more identified files of interest. A thread in this context is the smallest segment of instructions that can be handled independently by a scheduler module of the operating system of the user device. The sequential file reading pool creates multiple low-priority (as treated by a scheduler of the operating system of the user device) file reading threads a-n for file hashing, thereby enabling the EDR module to rapidly input data from the files of interest while at the same time not creating a processing burden at the user device. In some example test scenarios, the resulting file system hashing was empirically shown to be around 60 times faster than conventional file system hashing processes, thereby resulting in a technical improvement to computing devices that implement the file hashing processes disclosed herein.

Figure 1:
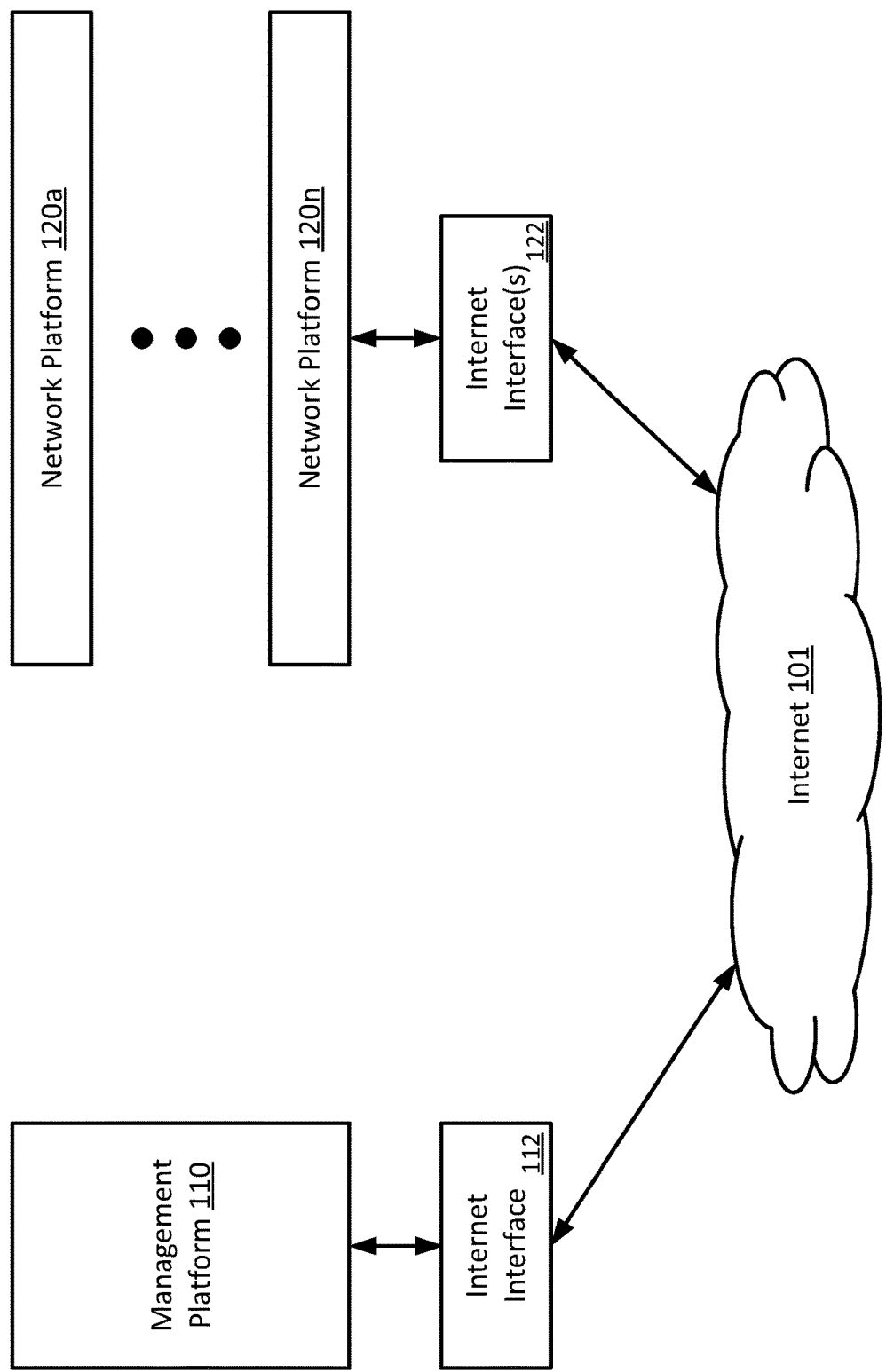
FIG. 1 shows a simplified operational environment for an endpoint detection and response (EDR) module at a user device, in accordance with some embodiments.

FIG. 1 shows a simplified operational environment 100 for an EDR module of a user device, in accordance with some embodiments. In general, the operational environment 100 includes a remote management platform 110, network platforms 120a-n, and an internet 101. The EDR module, described in detail herein, is implemented at one or more user devices (not shown) of the network platforms 120a-n. The remote management platform 110 is remote, from the perspective of the network platforms 120a-n. That is, the management platform 110 may be owned, located, and provided by independent organizations as compared to organizations that own the network platforms 120a-n. The network platforms 120a-n may each be associated with an independent organization or a sub-entity within an organization. The network platforms 120a-n and the management platform 110 are operable to communicate with each other through the internet 101 via respective internet interfaces 122, and 112.

Figure 30:
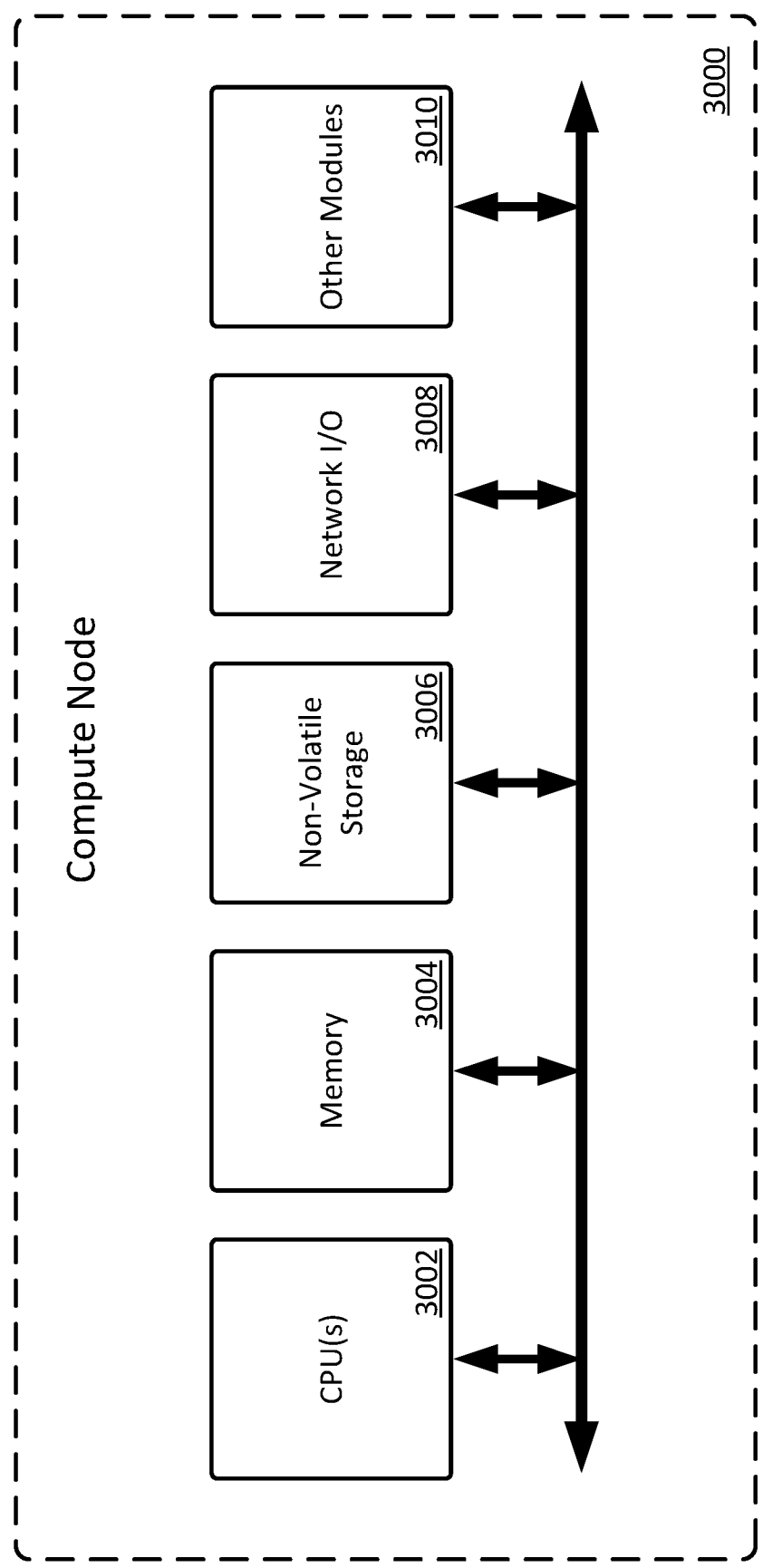
FIG. 30 shows a simplified hardware implementation of a compute node, in accordance with some embodiments.

A simplified example hardware implementation of a compute node to implement a portion of the management platform 110 or a portion of the network platforms 120a-n is shown in FIG. 30 described below. Details of the management platform 110 and the network platforms 120a-n follow.

Figure 2:
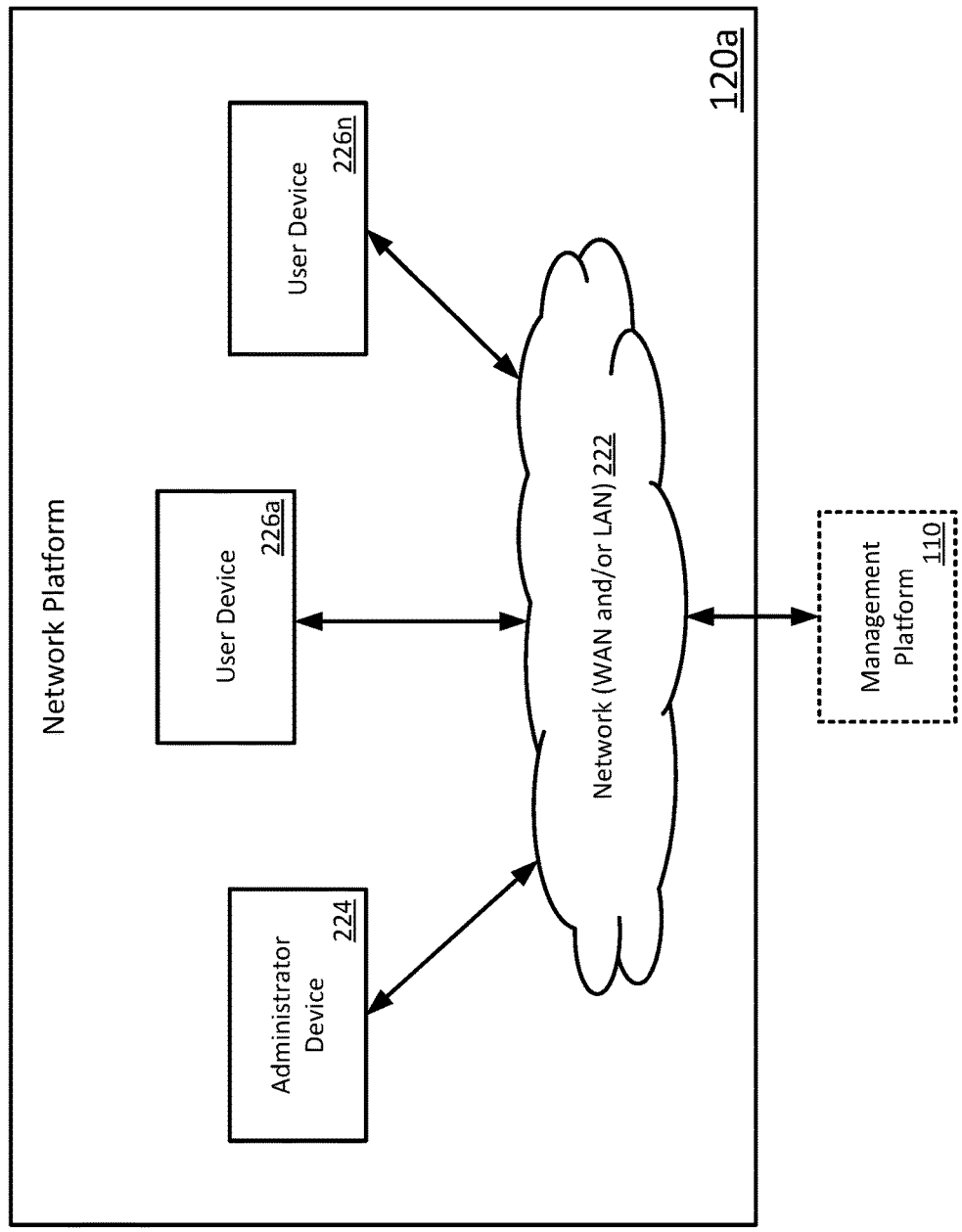
FIG. 2 shows a simplified example of a network platform of the operational environment in FIG. 1, in accordance with some embodiments.

FIG. 2 shows a simplified example of the network platform 120a (which is representative of any or all of the network platforms 120a-n) shown in FIG. 1, in accordance with some embodiments. In general, the network platform 120a includes an administrator device 224 that communicates with the management platform 110 via a wide area network (WAN) of a network 222 and communicates with user devices 226a-n via the WAN or a local area network (LAN) of the network 222. The network 222 may represent an intranet of an enterprise and/or the internet. The user devices 226a-n are also operable to communicate with the management platform 110 via the WAN of the network 222.

The administrator device 224 generally includes a computing device operated by an administrator of the network platform 120a. Functions of the administrator device 224 include using a web-based portal to select sets of configurations at the management platform 110 which are selectively applied to groups of the user devices 226a-n within the network platform 120a. Functions of the administrator device 224 may also include using a web-based portal to review reports generated by the management platform 110 detailing a configuration compliance status at each user device 226a-n to which those configurations apply.

To elaborate, the management platform 110 advantageously generates and stores configurations that may be applied to one or more of the user devices 226a-n. Configurations may be defined by preset parameters or adjustable variable parameters that control behaviors of the user devices 226a-n. For each configuration, a description of the behavior controlled by the parameters of that configuration may be stored for later viewing and optional selection by an operator of the administrator device 224.

In some embodiments, after different configurations are determined and stored, the management platform 110 generates an interface (e.g., a web-portal) that allows different administrator devices of different network platforms to determine (e.g., select) one or more sets of configurations that will respectively be applied to one or more different groups of user devices (also referred to herein as "computing devices"). In some embodiments, the interface is provided (i.e., served) by the management platform 110 to the administrator device 224 of the network platform 120a.

Using the interface, an operator of the administrator device 224 selects a set of configurations. Selection of a particular configuration may be carried out by way of providing an input that identifies a desired use of the configuration—e.g., selecting an option to activate the configuration, such as keeping a toggle at an "on" state or moving a toggle to an "on" state. Deselection of a particular configuration may be carried out by way of providing an input that identifies use of the configuration is not desired—e.g., selecting an option to deactivate the configuration, such as keeping a toggle at an "off" state or moving a toggle to an "off" state. While selecting configurations to include in a set, certain selected configurations may require initialization of, or allow for, adjustment to variables of those configurations (e.g., lengths of time associated with the functionality of the configurations, or other options affecting how configurations run on user devices).

In some embodiments, the operator of the administrator device 224 is presented, via a web-portal, with a predefined collection of configurations and is able to select particular configurations by keeping a toggle at an "on" state for those configurations of the predefined collection and moving a toggle to an "off" state for non-selected configurations of the predefined collection. Predefined collections may come in different forms, including collections of suggested configurations for complying with different compliance security standards, and the operator can select a particular collection for a particular standard from among other collections for other standards via a display presented by the web-portal.

In other embodiments, the operator of the administrator device 224 selects a previously created set of configurations and then edits that set graphically using the web-portal by adding or removing configurations from the set, or by modifying values of adjustable variables for particular configurations before saving an updated version that set that includes the modifications.

Because of the predefined collection of configurations provided by the management platform 110, and because of the simplified graphical interface provided by the web-portal by the management platform 110, an administrator may advantageously configure a user device to include EDR services much more easily than if the administrator were using conventional solutions which may require the administrator to write scripts or perform low-level configurations. The management platform 110 subsequently provides the user device(s) with an indication of the configurations that were selected by a user of the administrator device 224 and/or data that is, or is representative of, the selected configurations. The administrator device 224, the management platform 110, and/or the user device may identify and/or generate one or more security rules that are part of, or that are based on, the configurations selected by a user of the administrator device 224.

Figure 3:
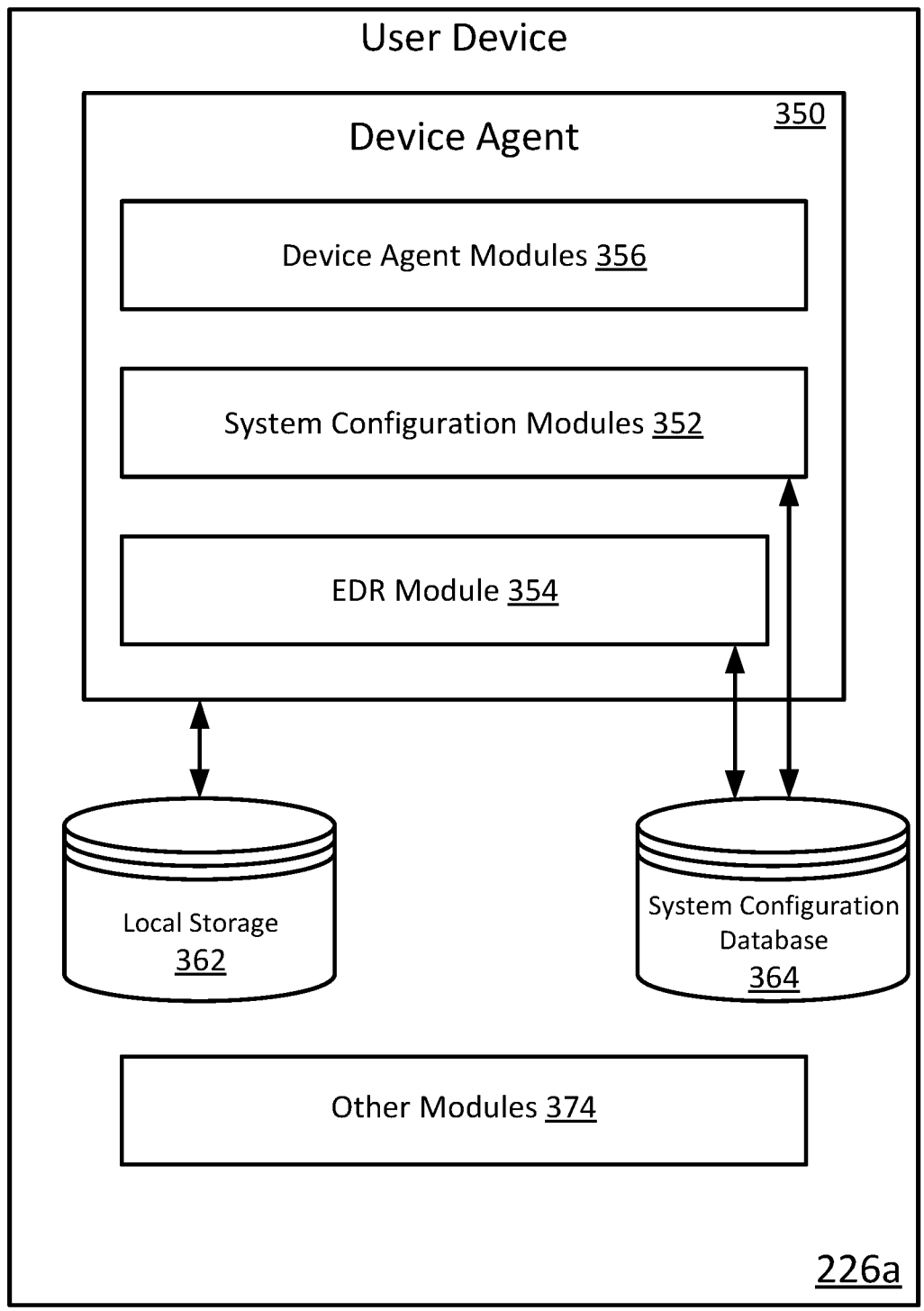
FIG. 3 shows a simplified example of a user device of the network platform shown in FIG. 2, in accordance with some embodiments.

FIG. 3 shows a simplified example of a user device 226a (which is representative of any or all of the user devices 226a-n) of the network platform 120a shown in FIG. 2, in accordance with some embodiments. The user device 226a is a computing device such as a server, a desktop computer, a laptop computer, a tablet computer, or a smartphone, among others. In general, the user device 226a includes a device agent 350 that is associated with the management platform 110, local storage 362 (e.g., one or more hard drives, volatile memory, and/or non-volatile memory), a system configuration database 364, and other modules 374. The other modules 374 may include, among others, modules that are related to the operating system installed and running at the user device 226a, as well as modules that are related to software applications that are installed at the user device 226a. In general, the device agent 350 includes system configuration modules 352, an EDR module 354, and other device agent modules 356. In some embodiments, the device agent 350 is installed at the user device 226a by the management platform 110. In other embodiments, the device agent 350 is installed, or is caused to be installed, on the user device 226a as part of a factory setup, pre-shipping setup, or re-seller setup process of the user device 226a. The device agent 350 is operable to receive and implement configurations, as described above, from the management platform 110.

The system configuration modules 352 are operable to configure, update, and remediate operating system settings and configurations, user account settings and configurations, and user settings and configurations of the user device 226a in accordance with configurations specified by the administrator device 224 using a web-portal of the management platform 110. The system configuration module 352 is additionally operable to configure the EDR module 354 in accordance with configurations specified by the administrator device 224 using the web-portal of the management platform 110.

Figure 4:
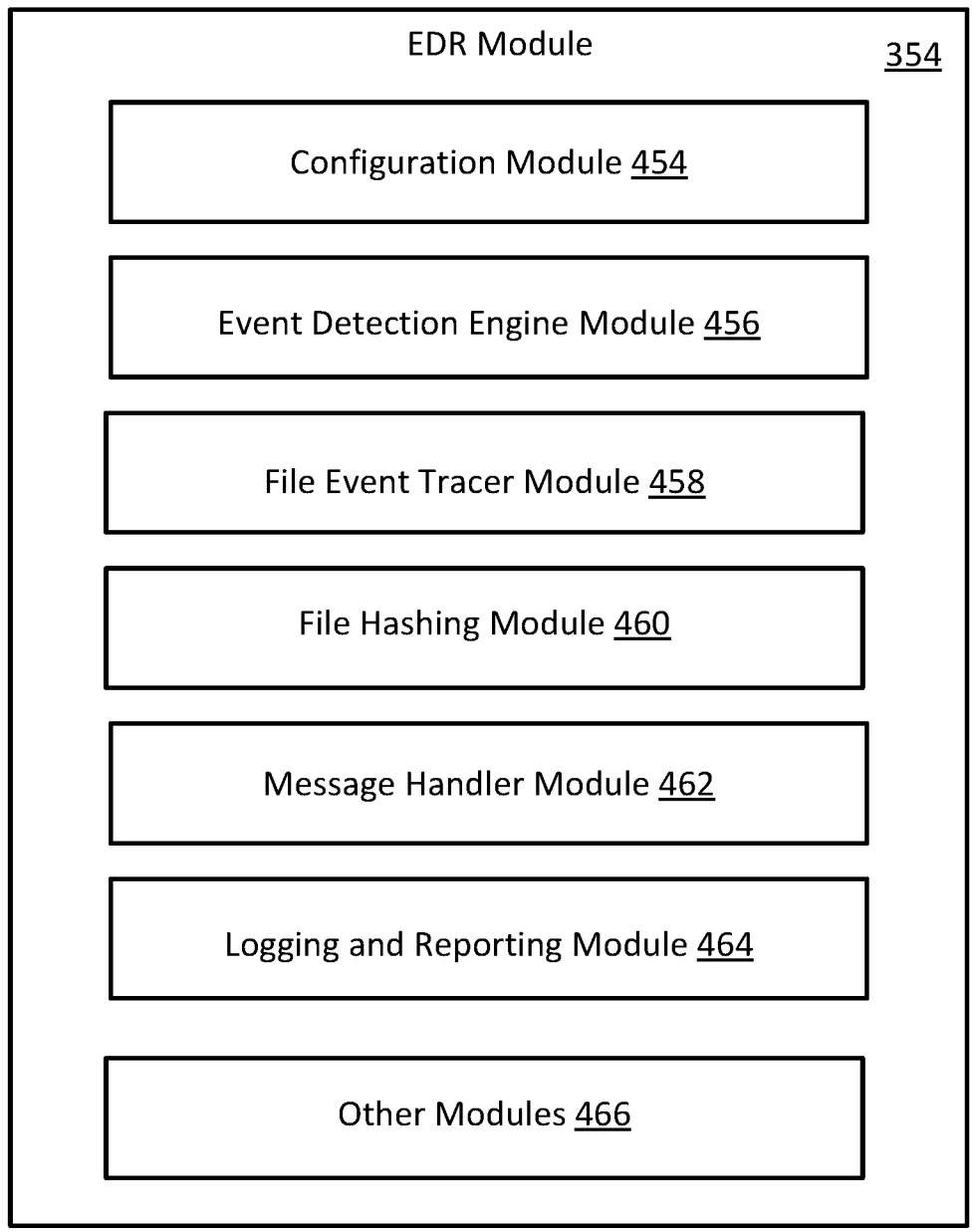
FIG. 4 shows a simplified example of an EDR module of a device agent of the user device shown in FIG. 3, in accordance with some embodiments.

A simplified example hardware implementation of a computing node to implement all or a portion of the user device 226a is shown in FIG. 30. FIG. 4 shows a simplified example of the EDR module 354 of the user device 226a shown in FIG. 3, in accordance with some embodiments. The EDR module 354 generally includes a configuration module 454 for receiving EDR configuration data (e.g., settings, rules, scheduling, event triggers, etc.) from the management platform 110 and configuring the EDR module 354, an event detection engine module 456 for detecting operating system events at the user device 226a (e.g., file creation, file copies, file moves, file renames, process instantiations, etc.), an event tracer module 458 for handling race conditions within the file system while conducting EDR operations, a file hashing module 460 to generate hash values of scanned files, a message handler module 462 for receiving and routing received instructions, a logging and reporting module 464, and other modules 466.

Figure 5:
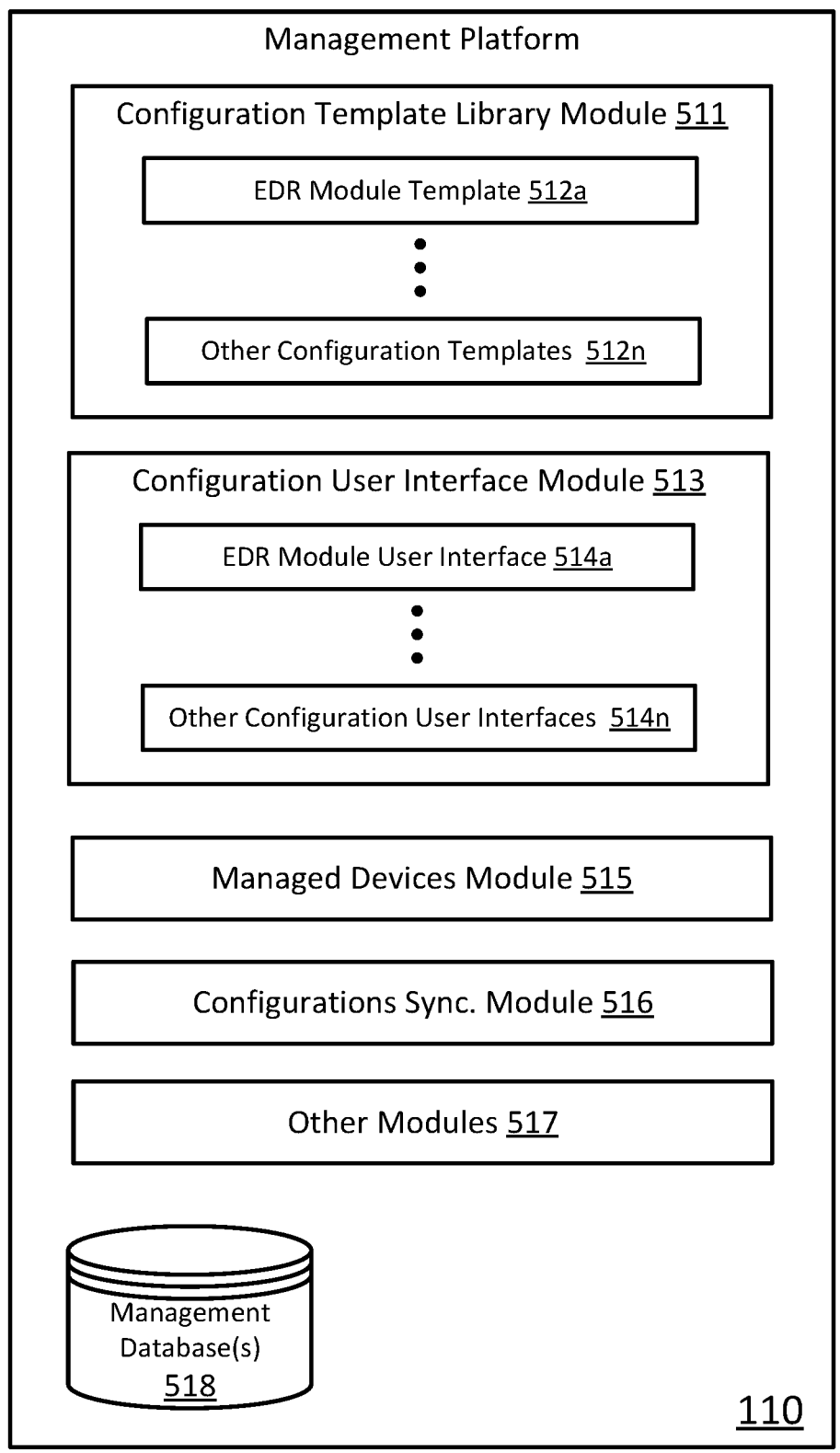
FIG. 5 shows a simplified example of a management platform of the operational environment in FIG. 1, in accordance with some embodiments.

FIG. 5 shows a simplified example of the management platform 110 of the operational environment 100 of FIG. 1, in accordance with some embodiments. In general, the management platform 110 includes a configuration template library module 511, a configuration user interface module 513, a managed devices module 515, a configuration synchronization module 516, other modules 517, and management databases 518. The configuration template library module 511 includes configuration templates, such as an EDR module template 512a, and other configuration templates 512n. The configuration user interface module 513 is operable to provide user interfaces (e.g., via a web portal or other applications), such as an EDR module configuration user interface 514a and other configuration user interfaces 514n.

The management platform 110 provides many different functionalities, including: maintaining available user device configurations; maintaining collections of configurations that are based on security standards; receiving administrator selections of configurations that apply to identified groups of user devices; providing local device agents to the identified user devices to register those user devices, and to enable implementation and remediation of configurations; providing selected configurations and any modules needed to implement the configurations to user devices; and generating reports that detail compliance statuses of those user devices. For example, the management platform 110 may advantageously configure the EDR module 354 based on enterprise security preferences or requirements.

The management platform 110 includes one or more of the management databases 518 that store different data that is used during processes for determining sets of configurations to associate with groups of user devices and methods for implementing a set of configurations on a user device and validating compliance with the configurations during scheduled intervals. In some embodiments, the data stored in the management databases 518 specifies or represents a library of separate configurations or collections of configurations, sets of configurations selected by administrators of network platforms 120a-n, groups of user devices selected by administrators of network platforms 120a-n, and reportable data that is determined from data reported by groups of computing devices. Individual, pre-built scripts for implementing individual configurations may also be stored in the management databases 518. The scheduled intervals may range from minutes (e.g., every 5 min or 15 minutes), to hours (e.g., every hour), to days (e.g., every day, every other day), to an event-based scheduled interval (e.g., on user device boot-up). In some embodiments, two or more scheduled intervals may be used simultaneously (e.g., checking configurations on user device boot-up and then every 15 minutes thereafter).

The management platform 110 includes computer software instructions—e.g., different software modules 511 through 517—that are used to carry out different aspects of methods for determining sets of configurations to associate with groups of user devices and for implementing a set of configurations on a user device and validating compliance with the configurations during scheduled intervals. Examples of the other modules 517 that are not shown include: module(s) for generating configurations; module(s) for determining sets of configurations; module(s) for determining groups of user devices; module(s) for generating installers of device agents; and module(s) for generating reports and alerts.

A simplified example hardware implementation of a computing device to implement all or a portion of the management platform 110 is shown in FIG. 30. Additional details regarding the management platform 110 are described in U.S. Pat. No. 11,102,251 B1, issued on Aug. 24, 2021, and entitled "Systems and Methods for Deploying Configurations on Computing Devices and Validating Compliance with the Configurations During Scheduled Intervals", which is owned by the present assignee and is incorporated herein by reference in its entirety.

Figure 6:
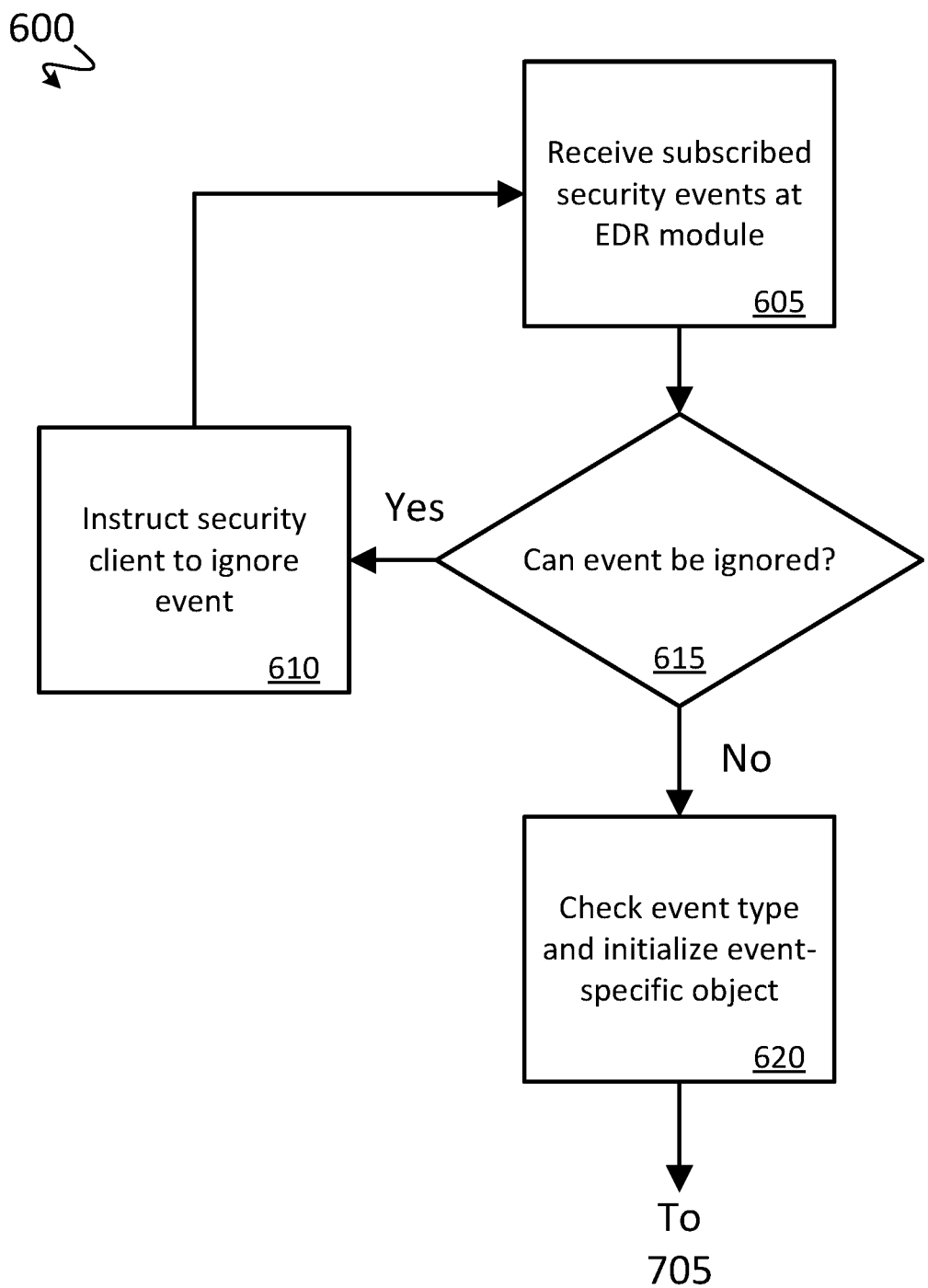
FIGS. 6-25 show simplified portions of a process for user device agent event detection and recovery using the EDR module shown in FIG. 3, in accordance with some embodiments.

FIG. 6 shows a simplified portion of an example process 600 for operating the endpoint detection and response module ("EDR module") 354 shown in FIG. 3, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 605, the EDR module 354 (i.e., a security module) receives an event notification (e.g., from an operating system of the user device 226a) in accordance with a set of subscribed events (e.g., as identified by the management platform 110, and/or from locally stored configuration data at the system configuration database 364). As part of step 605, or as part of an initialization step that is not shown, the EDR module 354 may subscribe, e.g., using an operating system of the user device 226*a*, to one or more event types so as to receive notifications of those events from the operating system of the user device 226*a*. Such events include file system changes (e.g., file creation, file name change, file directory change, file property change, file deletion), and events related to processes (e.g., an impending process instantiation, a process status, a process termination). Subscribing to an event in this context means that thereafter, the EDR module 354 will receive a notification (e.g., a software interrupt, or other notification) from the operating system upon occurrence of the event. Conversely, in general, the EDR module 354 will not receive notification from events that the EDR module 354 has not subscribed to.

For example, such events may include a notice that a file at the user device 226*a* has been written, removed, or moved, that a process at the user device has been requested to be run, that a process has been halted at the user device 226*a*, or another notification. At step 615, it is determined by the EDR module 354 whether the received event notification can be ignored based on a configuration setting of the EDR module 354. If it is determined at step 615 that the received security event can be ignored (e.g., based on a configuration setting), flow of the process 600 continues to step 610. At step 610, the EDR module 354 instructs sub-modules thereof to ignore the received event. In some embodiments, this instructs the EDR module that an entire process may be ignored and/or that reporting for that process may be muted (i.e., not logged or transmitted to the management platform). For example, if events are received for a process that is known by the EDR module 354, based on configuration settings, to be safe, then the EDR module 354 advantageously saves computational resources of the user device 226*a* by not transmitting file events for that process.

If it was determined at step 615 that the received event cannot or should not be ignored, flow of the process continues to step 620. At step 620, the event type is checked (e.g., against a set of rules or event identifiers) and an event-specific object is initialized by the EDR module 354 to handle the received event. Flow of the process then continues to step 705 shown in FIG. 7.

Figure 7:
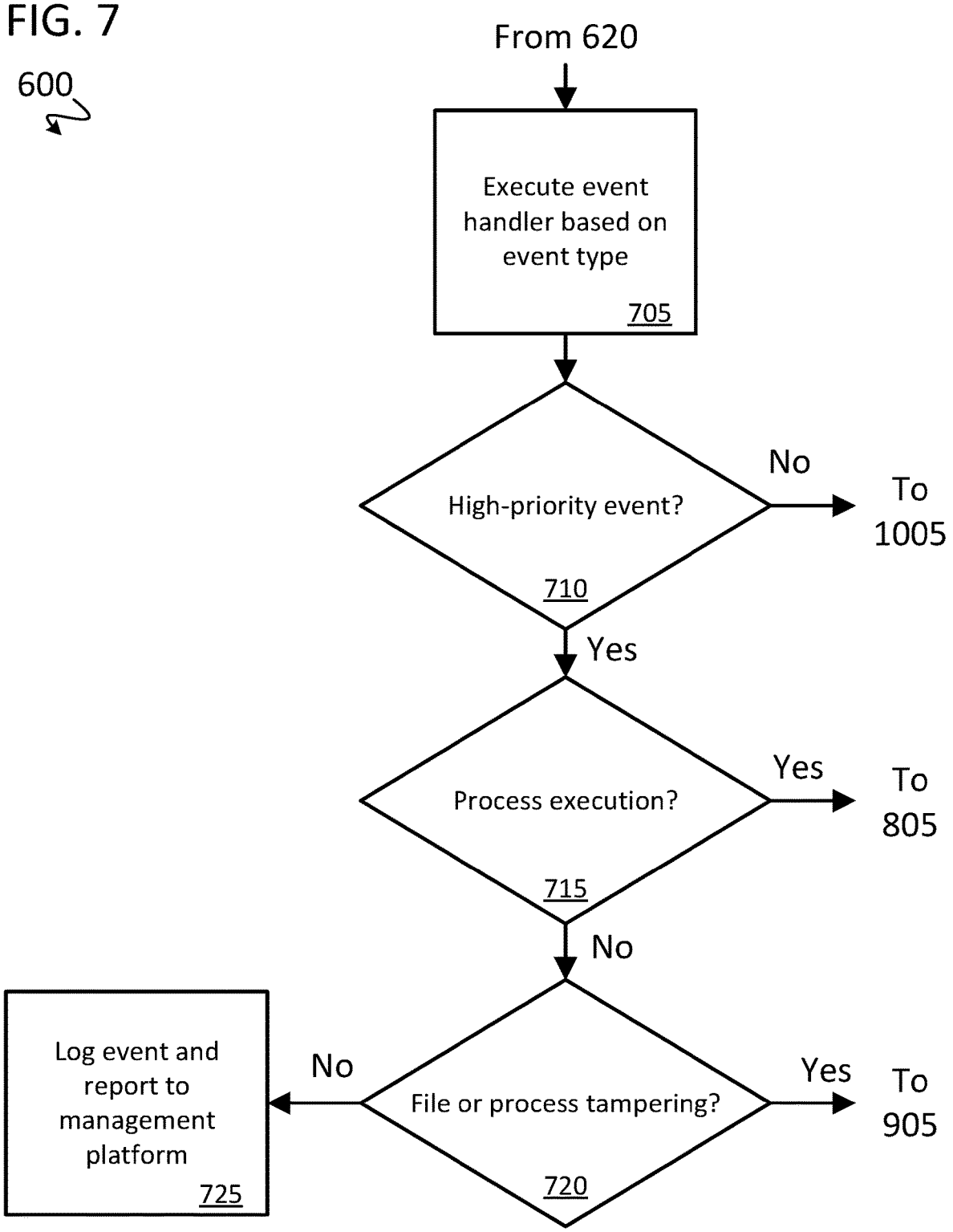

FIG. 7 shows a simplified portion of the example process 600 for operating the EDR module 354 shown in FIG. 3, in accordance with some embodiments. At step 705, an event handler is executed by the EDR module 354 (i.e., instantiated or run) based on the detected event type. At step 710, the event handler determines if the received event is a high-priority event that needs to be handled immediately with the highest priority and speed, e.g., as specified by configuration settings of the EDR module 354. If it is determined at step 710 that the received event is not a high-priority event, flow of the process 600 continues to step 1005 shown in FIG. 10. If it is determined at step 710 that the received event is a high-priority event, flow continues to step 715. At step 715, it is determined if the received event indicated that a process execution has been initiated or requested. If it is determined at step 715 that process execution has begun or is about to begin, flow of the process 600 continues to step 805 shown in FIG. 8. If it was determined at step 715 that process execution has not begun and is not about to begin, flow continues to step 720. At step 720, it is determined whether the received event indicates that a high-priority file or process is, or has been, tampered with (e.g., modified in some way). Examples of high-priority files and processes are configurable at the management platform 110 and may include files and processes that specifically relate to the device agent 350 and/or the EDR module 354. If it is determined at step 720 that a high-priority file or process is, or has been, tampered with, flow of the process continues to step 905 shown in FIG. 9. If it was determined at step 720 that a high-priority file or process has not been tampered with, flow of the process continues to step 725. At step 725, the received event is logged locally at the user device 226*a* and/or reported to the management platform 110.

Figure 8:
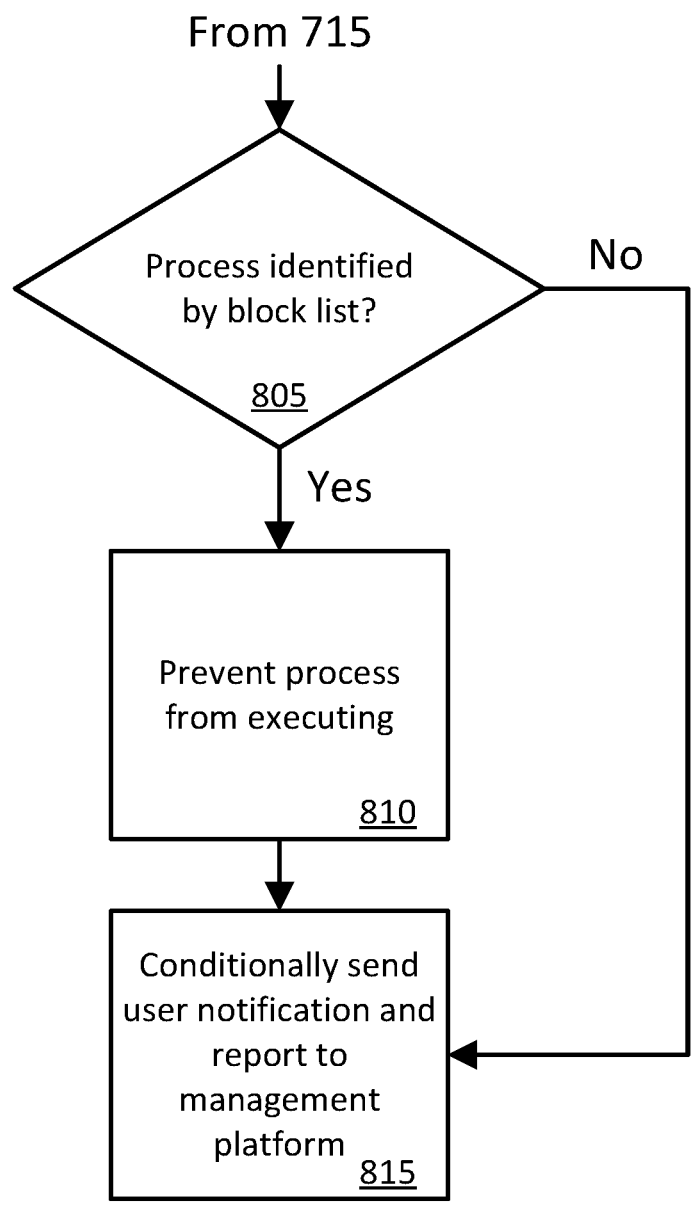

FIG. 8 shows a simplified portion of the example process 600 for operating the EDR module 354 shown in FIG. 3, in accordance with some embodiments. Step 805 continues from step 715 shown in FIG. 7. At step 805, it is determined by the EDR module 354 whether the detected process is identified by a list of blocked applications (e.g., as specified by configuration data of the EDR module 354). If it is determined at step 805 that the detected process is not among the list of blocked applications, flow continues to step 815. If it was determined at step 805 that the detected process is identified by the list of blocked applications, flow continues to step 810. At step 810, the process is prevented from executing (e.g., by an operating system command issued or requested by the EDR module 354). Flow then continues to step 815. At step 815, a user notification (e.g., in the case where a process was blocked from executing) is issued to a user interface of the user device 226*a*, and/or the event is logged to the management platform 110.

Figure 9:
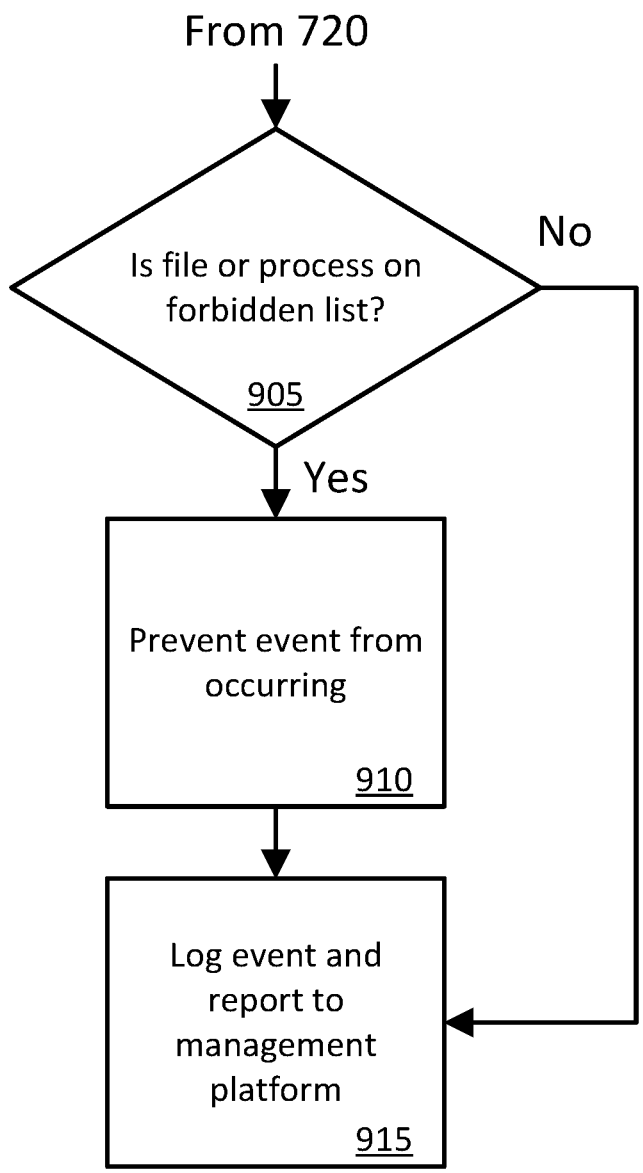

FIG. 9 shows a simplified portion of the example process 600 for operating the EDR module 354 shown in FIG. 3, in accordance with some embodiments. Step 905 continues from step 720 shown in FIG. 7. At step 905, it is determined by the EDR module 354 whether the modified (i.e., tampered with) file or process is identified by a list of files and processes for which modification is forbidden (e.g., as specified by configuration data of the EDR module 354). If it is determined at step 905 that the detected file or process is not among the list of files and processes that should not be modified, flow continues to step 915. If it was determined at step 905 that the detected file or process is identified by the list of files and processes that should not be modified, flow continues to step 910. At step 910, the file or process modification is prevented from executing (e.g., by an operating system command issued or requested by the EDR module 354). Flow then continues to step 915. At step 915, a user notification (e.g., in the case where a process was blocked from executing) is issued to a user interface of the user device 226*a*, and/or the event is logged to the management platform 110.

Figure 10:
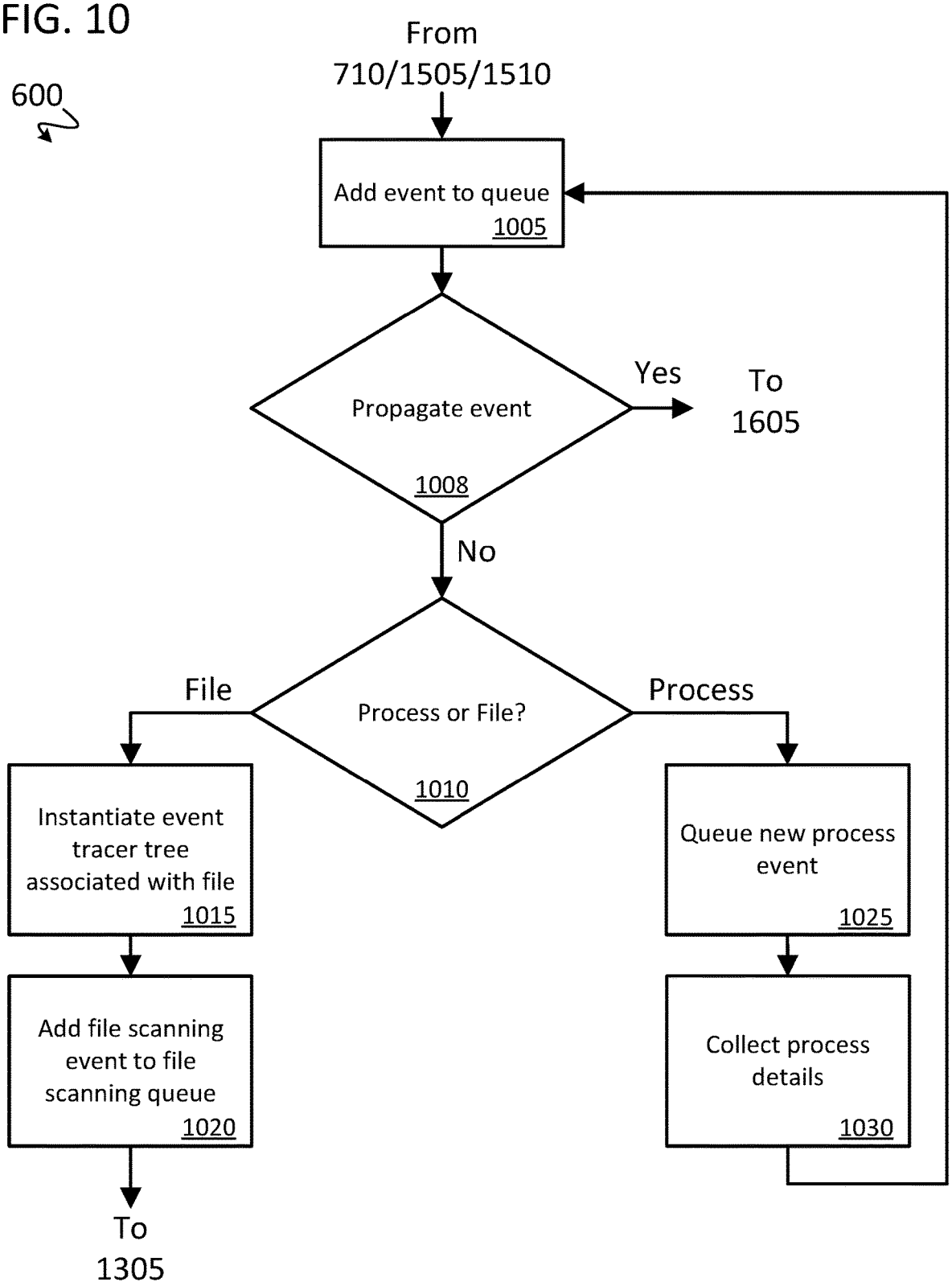

FIG. 10 shows a simplified portion of the example process 600 for operating the EDR module 354 shown in FIG. 3, in accordance with some embodiments.

Figure 15:
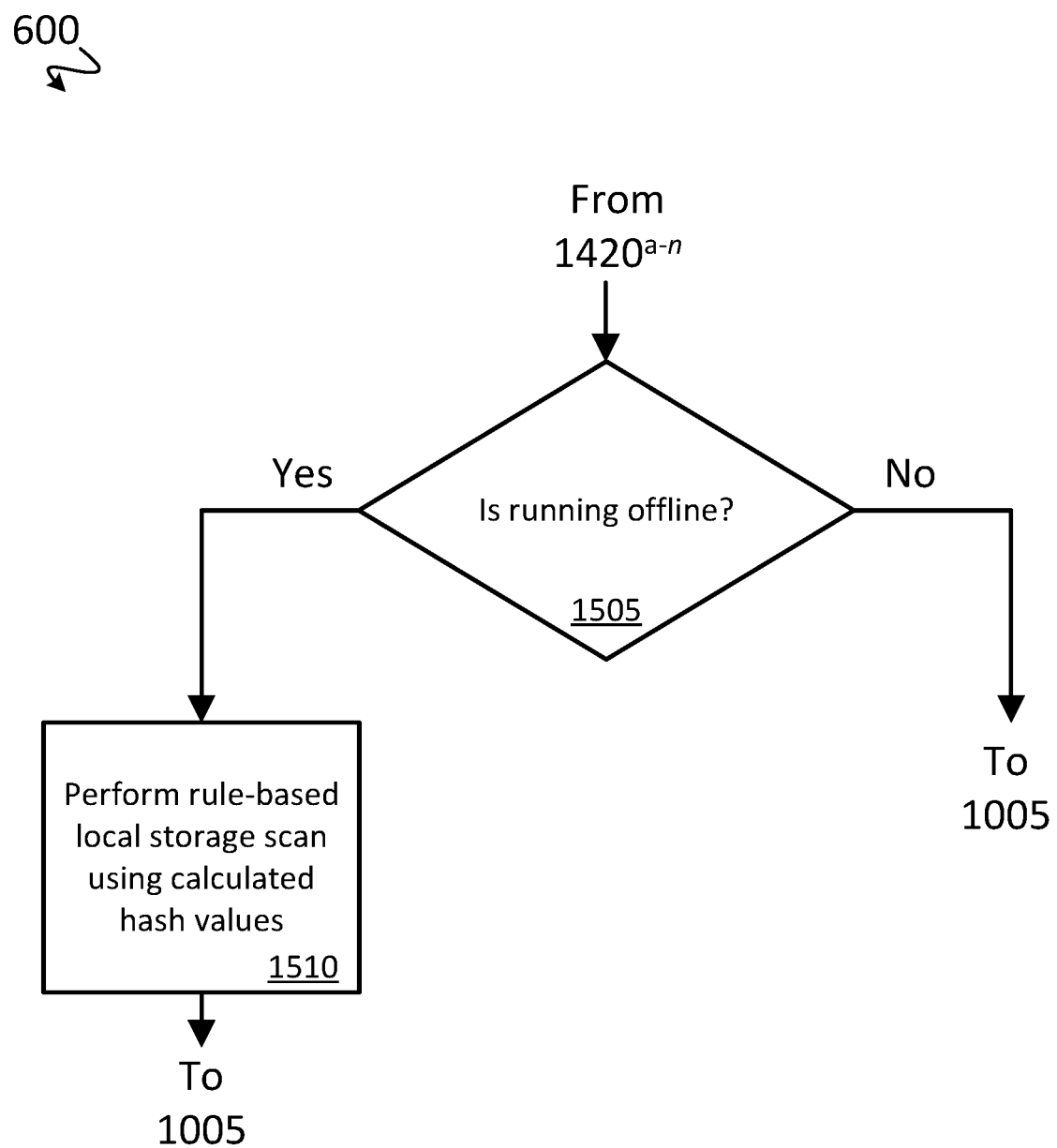

Step 1005 continues from any of step 710 shown in FIG. 7, step 1505 shown in FIG. 15, or step 1510 shown in FIG. 15. At step 1005, a received low-priority event is added to an event processing queue (e.g., as a data object that contains information about the event). A low-priority event is an event, in accordance with a configuration setting of the EDR module 354, that does not constitute an immediate or currently known security risk. At step 1008, it is determined if the next event data object on the event processing queue should be propagated (e.g., as a message via inter-process communication (IPC)) to an event handler module of the EDR module 354. For example, if the next event data object on the event processing queue is associated with a hash value or other information that has been determined for a process or file, the flow of the process 600 can continue on to take appropriate steps based on security rules and the determined information. If it is determined at step 1008 that the next event data object on the event processing queue should be sent to an event handler module of the EDR module 354, flow of the process 600 continues to step 1605 shown in FIG. 16. Otherwise, the flow of the process 600 continues to step 1010.

At step 1010, it is determined by the EDR module 354 whether the next event to be processed in the event processing queue relates to a process or a file. If it is determined at step 1010 that the next event to be processed relates to a file, flow continues to step 1015.

At step 1015, the EDR module 354 instantiates an event tracer tree that is associated with the file. Event tracing is described in greater detail with reference to FIGS. 22-26. The event tracer tree advantageously mitigates file system race conditions while the file is being scanned by the EDR module 354. For instance, the event tracer tree enables the EDR module 354 to continue scanning an identified file even if the file is moved between locations in the file system or is renamed. Additionally, if a file is moved during or after scanning, the event tracer tree enables the EDR module 354 to still quarantine the file. At step 1020, a file scanning event is added by the EDR module 354 to a file scanning queue. Flow of the process 600 then continues to step 1305 shown in FIG. 13.

If it was determined at step 1010 that the next event to be processed relates to a process, flow continues from step 1010 to step 1025. At step 1025, the EDR module 354 adds a new process scanning event to a process scanning queue. At step 1030, the next process to be scanned in the process scanning queue is scanned by the EDR module 354 to collect process details (e.g., ownership, authorship, an originating website, etc.). Flow then continues back to step 1005 to handle the next event in the event queue.

Figure 11:
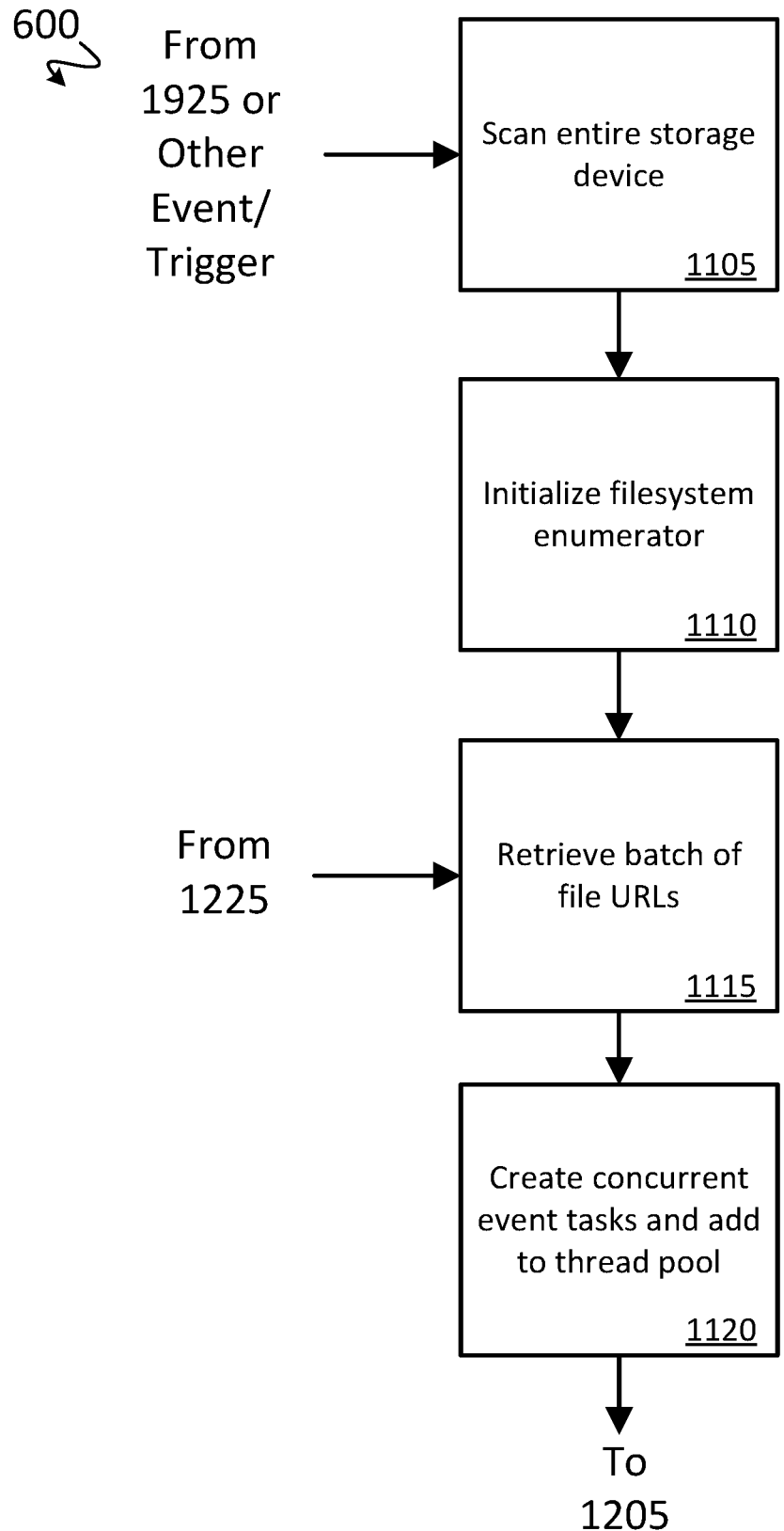

FIG. 11 shows a simplified portion of the example process 600 for operating the EDR module 354 shown in FIG. 3, in accordance with some embodiments.

Figure 19:
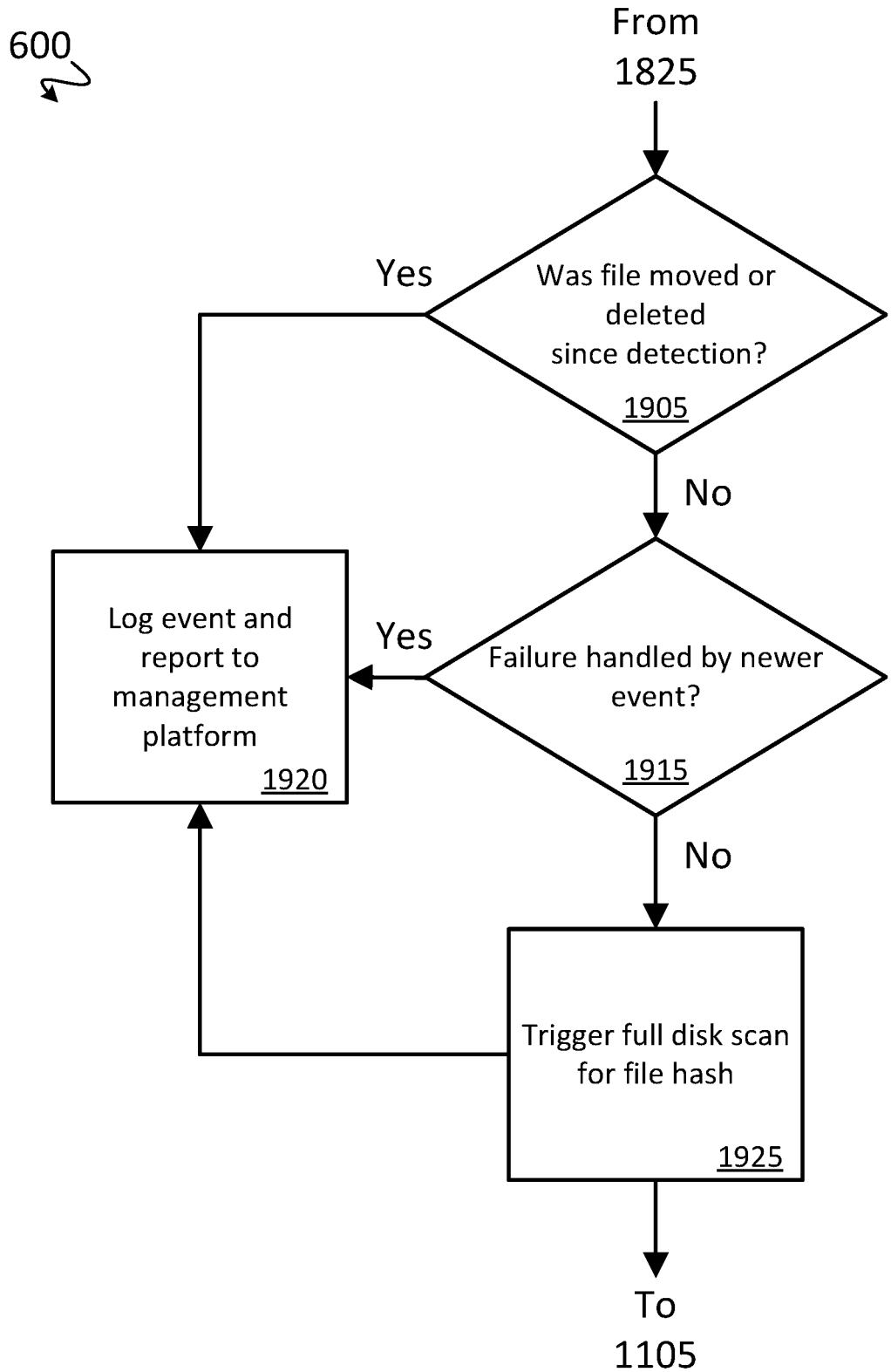

In some instances, step 1105 continues from step 1925 shown in FIG. 19, or could be triggered by the EDR module 354 or another module of the device agent 350 (e.g., on the first system startup, in response to a command from the management platform 110, based on a recurring schedule, or in response to another event). At step 1105, a scan of all or a portion of a storage device (e.g., a hard drive) of the user device 226a is initialized. At step 1110, a file system enumerator to traverse the drive, partition, or directory is initialized by the EDR module 354. At step 1115, a batch of file URLs is retrieved by the file system enumerator. A file URL is a Uniform Resource Locator that designates a file of a file system on the user device 226a. At step 1120, a group of concurrent event tasks is created and added to a thread pool of the operating system at the user device 226a, each event task being assigned to a respective one of the file URLs identified by the file system enumerator. Flow of the process then continues to step 1205 shown in FIG. 12.

Figure 12:
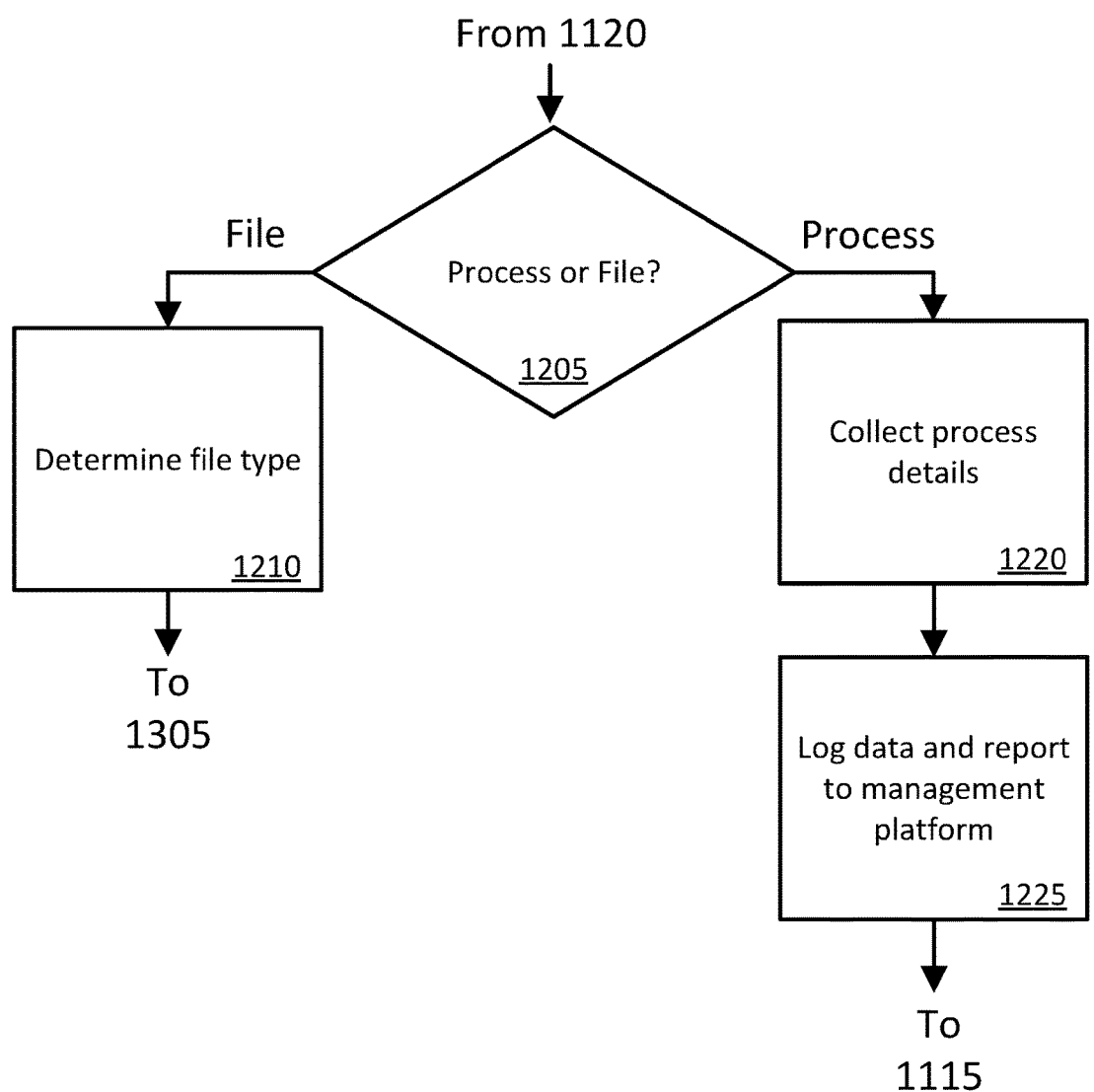

FIG. 12 shows a simplified portion of the example process 600 for operating the EDR module 354 shown in FIG. 3, in accordance with some embodiments. Step 1205 continues from step 1120 shown in FIG. 11. At step 1205, for each of the event tasks that were added to the thread pool, it is determined whether that event tasks' associated file URL corresponds to a file associated with a process or to a data file (e.g., based on a file type, file header information, file system information, or other information associated with the file URL). If it is determined at step 1205 that the file URL corresponds to a data file, the flow of the process continues to step 1210. At step 1210, a file type of the file is determined by the EDR module, and then flow of the process 600 continues to step 1305 shown in FIG. 13. If it was determined at step 1205 that the file URL corresponds to a process, flow of the process 600 continues to step 1220. At step 1220, details about the process associated with the file URL are collected by the EDR module 354 (e.g., ownership, authorship, an originating website, etc.). At step 1225, collected details/data are logged by the EDR module 354 and reported to the management platform 110. Flow of the process 600 then returns to step 1115 shown in FIG. 11.

Figure 13:
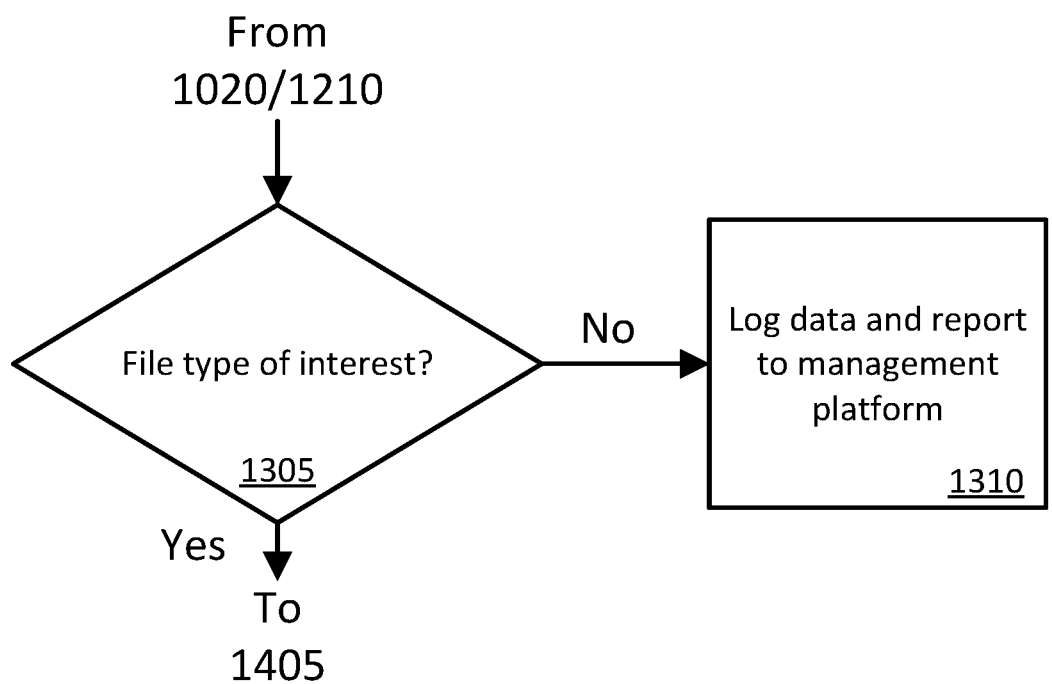

FIG. 13 shows a simplified portion of the example process 600 for operating the EDR module 354 shown in FIG. 3, in accordance with some embodiments. Step 1305 continues from either step 1020 shown in FIG. 10 or from step 1210 shown in FIG. 12. At step 1305, it is determined by the EDR module 354 whether an identified file type is a file type of interest (e.g., as identified by the file scanning event from the file scanning queue shown in FIG. 10 or from a file type identified during a scan of the entire storage device as shown in FIG. 12). In some embodiments, a file type of interest is specified by configuration settings or security rules of the EDR module 354. A set of file types of interest may be part of the EDR module 354 configuration data that is specified by the management platform 110. If it is determined at step 1305 that the identified file type is a file type of interest, flow of the process continues to step 1405 shown in FIG. 14. If it was determined at step 1305 that the identified file type is not a file type of interest, flow of the process continues to step 1310. At step 1310, the identified file type is logged by the EDR module 354 and reported to the management platform 110.

Figure 14:
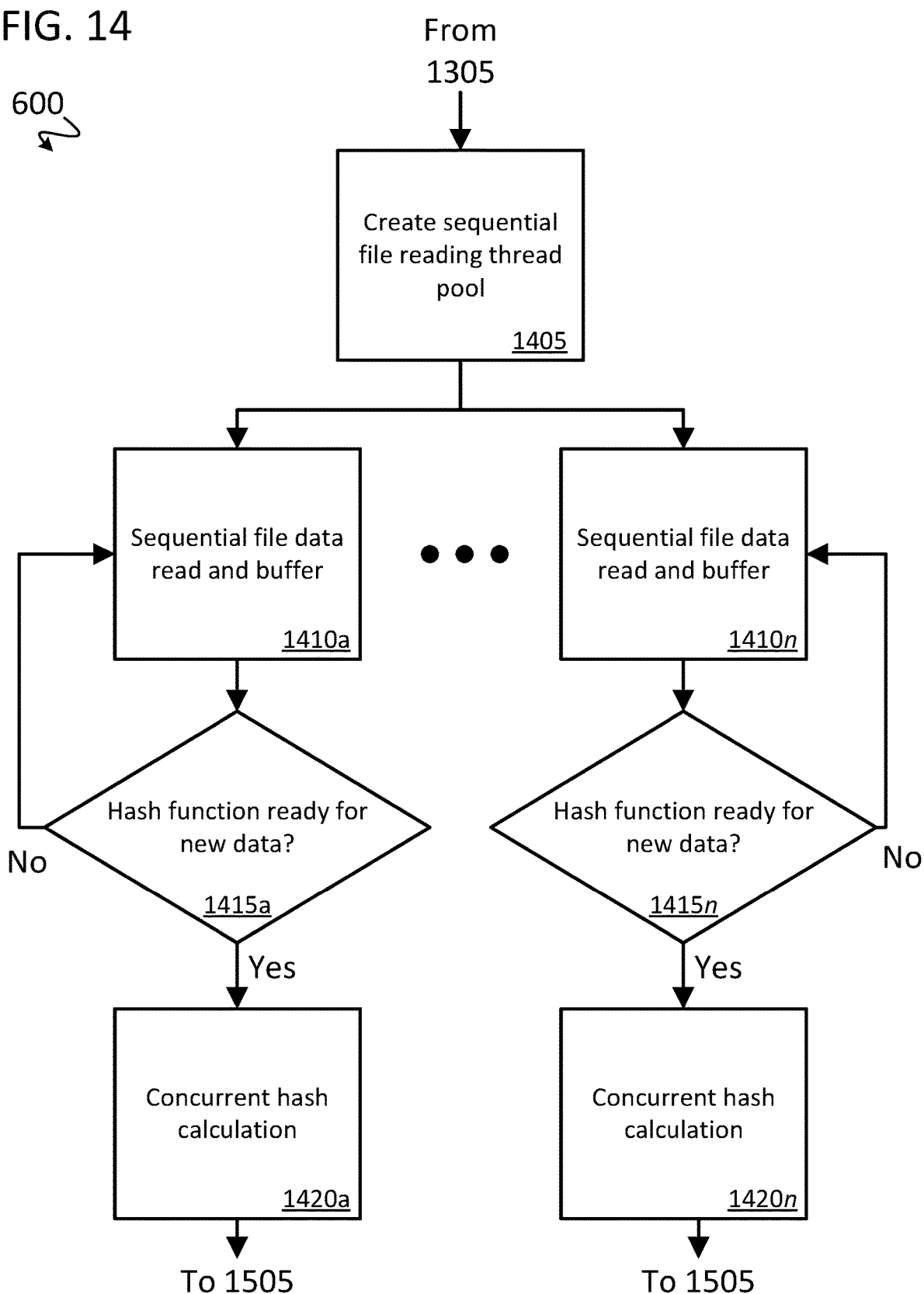

FIG. 14 shows a simplified portion of the example process 600 for operating the EDR module 354 shown in FIG. 3, in accordance with some embodiments.

Step 1405 continues from step 1305 shown in FIG. 13. At step 1405, the EDR module 354 advantageously creates a sequential file reading thread pool at the user device 226a to read one or more identified files of interest. Sequential file reading involves accessing data in a file one record at a time, starting from the beginning of the file and proceeding to the end of the file. The sequential file reading pool instantiates multiple low-priority (as treated by the operating system of the user device 226a) file reading threads a-n for file hashing, thereby enabling the EDR module 354 to rapidly input data from the files of interest while at the same time not creating a processing burden at the user device 226a. In some example test scenarios, the resulting file system hashing was empirically shown to be around 60 times faster than conventional file system hashing processes.

At steps 1410a-n, each thread of the sequential file reading pool sequentially reads data from the file associated with that respective thread. At steps 1415a-n, each of the sequential file reading threads is advantageously operable to communicate with a respective hashing function to determine if the hashing function is ready for more data to process for determining a hash value of the associated file. If it is determined at steps 1415a-n that a respective hashing function is not ready for more data, flow returns to steps 1410a-n, during which the sequential file reading threads continue to read in and buffer data from the file system. As such, file system data is read asynchronously from the hashing function. If it was determined at step 1415a-n that an associated hashing function is ready for more data, flow continues to steps 1420a-n. At step 1420a-n, concurrent parallel hashing functions receive data from their respective associated sequential file reading thread to determine a hash value for the associated file. The concurrent parallel hashing functions are referred to as such as they are advantageously operable to determine more than one hash value for the file concurrently. For example, each of the concurrent parallel hashing functions is operable to determine a respective hash function of the SHA-2 family concurrently (e.g., SHA-224, SHA-256, SHA-384, SHA-512, etc.) with other hash functions. For example, a first hash function may determine a SHA-256 hash value of a first set of input data and a second hash function may concurrently determine a SHA-384 hash value of the same first set of input data. Such parallel hash determination provides the technical advantage of creating multiple hashes for the same file such that the hashes may be compared to disparate security databases.

For example, the management platform 110 may maintain a list of blocked processes and applications that are identified by SHA-256 hashes, whereas a third-party security database may maintain a list of malware that is identified by using SHA-384 hashes. By determining multiple hash values for scanned files and processes concurrently, the EDR module 354 can compare the determined hash values to a wider variety of databases than if only one type of hash value were determined. As such, the EDR module 354 provides greater compatibility and speed in checking file hashes against security databases as compared to conventional solutions which either only create one type of hash value, or which have to generate a new hash value upon determining that a particular database does not support the previously generated hash value. Flow from the steps 1420*a-n* continues to step 1505 of FIG. 15.

FIG. 15 shows a simplified portion of the example process 600 for operating the EDR module 354 shown in FIG. 3, in accordance with some embodiments. Step 1505 continues from steps 1420*a-n* shown in FIG. 14. At step 1505, it is determined by the EDR module 354 whether the user device 226*a* is operating offline (i.e., without connectivity to the management platform 110). If it is determined at step 1505 that the user device 226*a* is operating offline, at step 1510, the calculated file system hash values are used to perform a rule-based local scan of the storage device using security rules (e.g., YARA ("Yet Another Recursive Acronym") rules) which may be specified by the management platform 110. In some embodiments, the security rules include text-based patterns that describe characteristics of files, such as specific byte sequences, strings, regular expressions, or more. Additionally, the security rules may include file signature values that correspond to a calculated hash value of a file (e.g., MD5, SHA-224, SHA-256, SHA-384, SHA-512, etc.). The security rules may be used by the EDR module 354 to identify and classify files based on the presence of these patterns.

Flow then returns to step 1005 shown in FIG. 10. If it was determined at step 1505 that the user device 226*a* is not operating offline, flow of the process 600 returns to step 1005 shown in FIG. 10.

Figure 16:
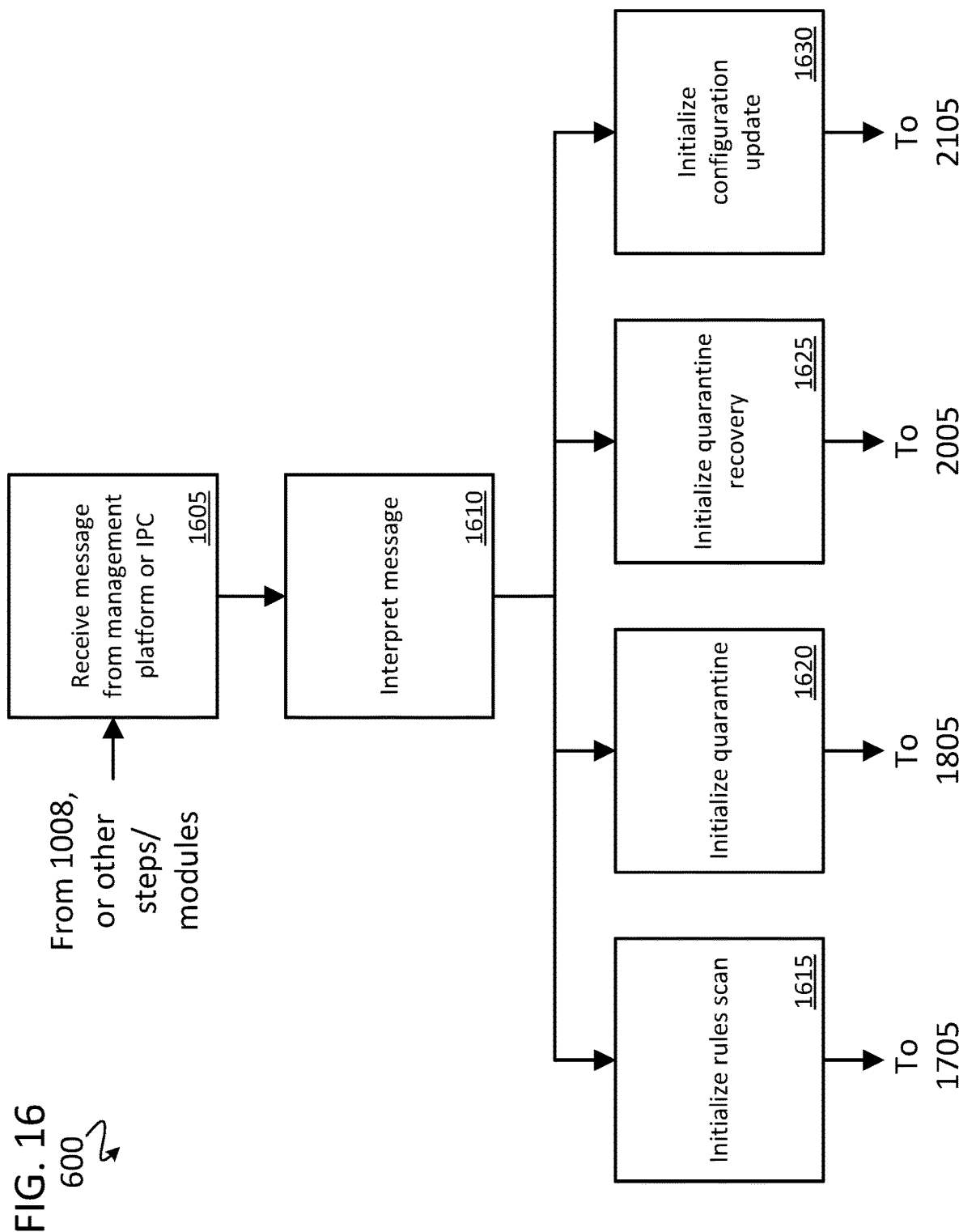

FIG. 16 shows a simplified portion of the example process 600 for operating the EDR module 354 shown in FIG. 3, in accordance with some embodiments. At step 1605, the EDR module 354 receives a message via inter-process communication (IPC) as a step of the process 600, from another process at the user device 226*a* that is associated with the EDR module 354, or from the management platform 110. At step 1610, the received message is interpreted by the EDR module 354. If the received message indicates that a rules scan of the user device 226*a* should be conducted by the EDR module 354, flow continues to step 1615 where the rules scan is initialized. Flow of the process 600 then continues to step 1705 shown in FIG. 17. If the received message indicates that a file or process of the user device 226*a* should be quarantined by the EDR module 354, flow continues to step 1620 where the file or process quarantine is initialized. Flow of the process 600 then continues to step 1805 shown in FIG. 18. If the received message indicates that a file or process of the user device 226*a* should be restored from quarantine by the EDR module 354, flow continues to step 1625 where the file or process quarantine recovery is initialized. Flow of the process 600 then continues to step 2005 shown in FIG. 20. If the received message indicates that a configuration of the EDR module 354 should be updated, flow continues to step 1630 where the configuration update is initialized. Flow of the process then continues to step 2105 shown in FIG. 21.

Figure 17:
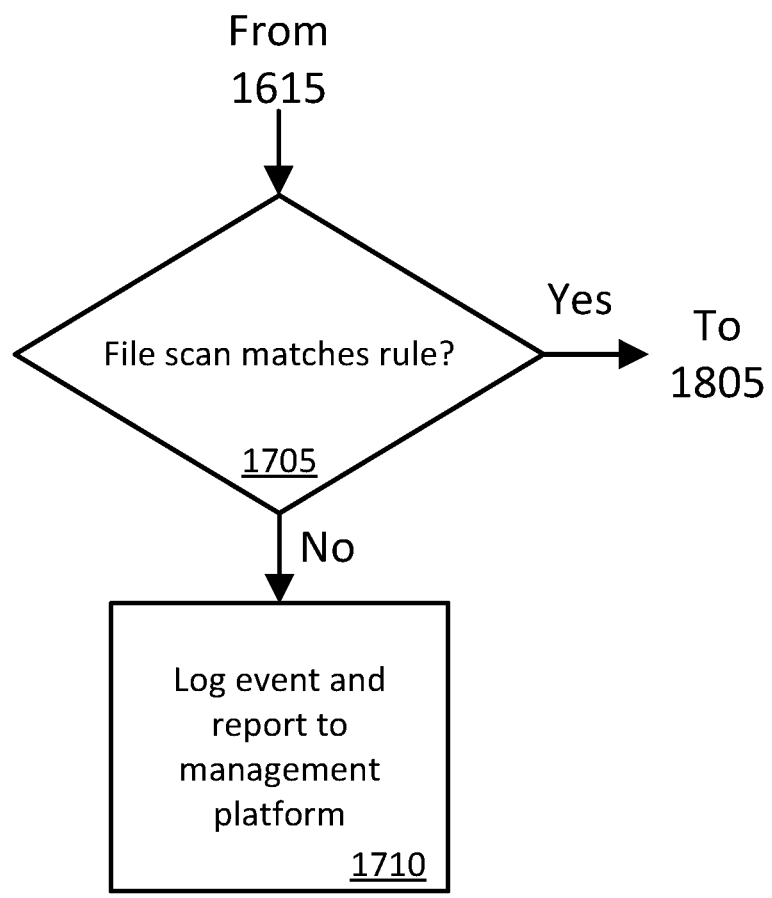

FIG. 17 shows a simplified portion of the example process 600 for operating the EDR module 354 shown in FIG. 3, in accordance with some embodiments. Step 1705 continues from step 1615 shown in FIG. 16 which initialized a user device rules scan. At step 1705 it is determined if the hash of the scanned file matches one or more of the specified rules (e.g., a list of forbidden files or processes identified by respective hash values which may be part of the EDR module 354 configuration data). If it is determined that the scanned file matches one or more of the specified rules, flow of the process 600 continues to step 1805 shown in FIG. 18. If it was determined at step 1705 that the scanned file does not match one or more of the specified rules, flow continues to step 1710. At step 1710, the event is logged by the EDR module 354 and/or reported to the management platform 110.

Figure 18:
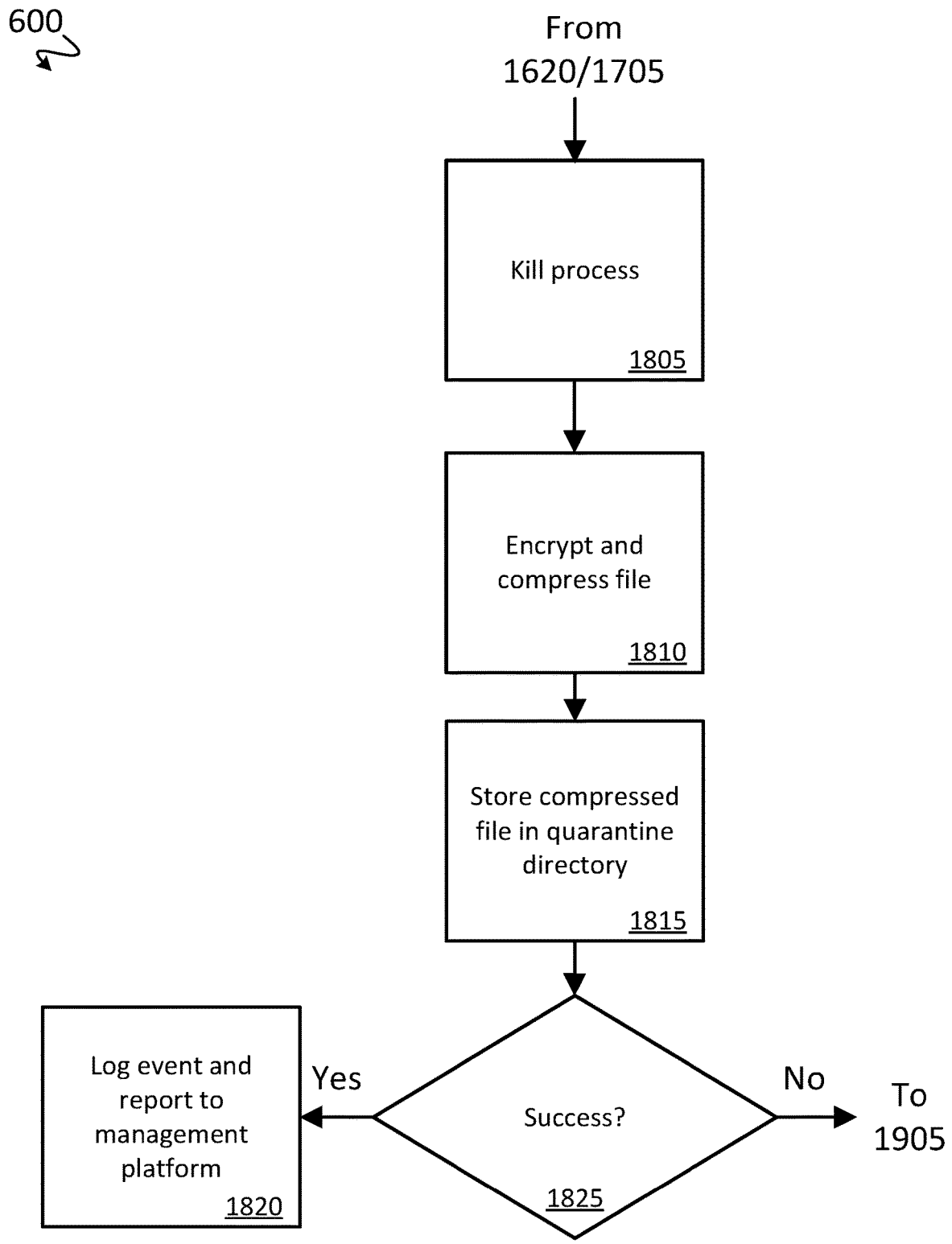

FIG. 18 shows a simplified portion of the example process 600 for operating the EDR module 354 shown in FIG. 3, in accordance with some embodiments. Step 1805 continues from either step 1620 shown in FIG. 16 which initialized a quarantine directive for a file or process or from step 1705 shown in FIG. 17. At step 1805, if the file system element that was flagged for quarantine is a process, that process is stopped (i.e., execution is halted). If the file system element was a data file, step 1805 may be skipped. At step 1810, the identified file, or file associated with the identified process, is advantageously encrypted and compressed by the EDR module 354. At step 1815, the compressed file is stored in a quarantine file system directory at the user device 226*a* by the EDR module 354. Encrypting the quarantined file provides a technical benefit of preventing a malicious process (or user) from restoring the quarantined file to normal operation in the file system. That is, even if a malicious process or user is able to identify where in the file system quarantined files are stored, because the quarantined files are encrypted, the malicious process or user cannot simply restore the quarantined file to another location.

At step 1825, it is determined if the identified file, or file associated with the identified process, has been successfully quarantined. If it is determined at step 1824 that the quarantine is successful, flow continues to step 1820. At step 1820, the event is logged locally and/or reported to the management platform 110 by the EDR module 354. If it was determined at step 1825 that the file was not successfully quarantined, flow of the process 600 continues to step 1905 shown in FIG. 19.

FIG. 19 shows a simplified portion of the example process 600 for operating the EDR module 354 shown in FIG. 3, in accordance with some embodiments. Step 1905 continues from step 1825 shown in FIG. 18 in response to a determination that the quarantine of a file failed. At step 1905, it is determined if the file was moved or deleted since detection. If it is determined at step 1905 that the file was not moved or deleted since detection, flow of the process continues to step 1915. At step 1915 it is determined if the quarantine failure is already being handled by a more recent event. If it is determined at step 1915 that the quarantine failure is not already being handled by a more recent event, flow continues to step 1925. At step 1925, a full disk scan to determine and inspect file hashes is triggered by the EDR module 354, upon which flow of the process 600 returns to step 1105 of FIG. 11 and additionally flows to step 1920 where the event is logged by the EDR module 354 and/or reported to the management platform 110. Additionally, if it was determined at step 1905 that the file was moved or deleted since detection, or if it was determined at step 1915 that the quarantine failure is being handled by a newer event, flow continues to step 1920.

Figure 20:
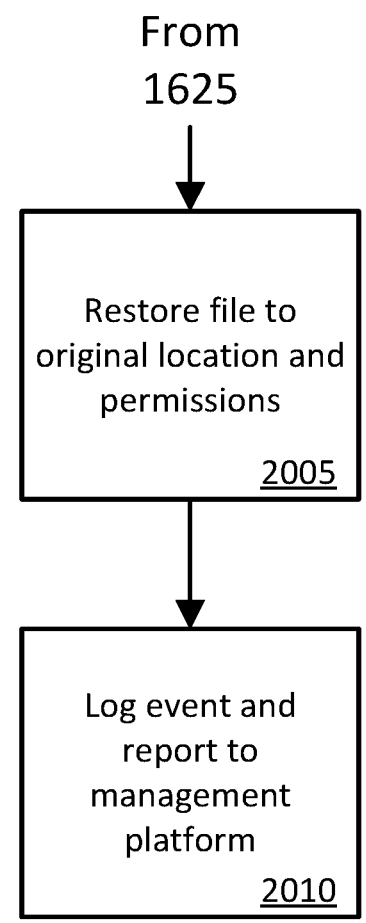

FIG. 20 shows a simplified portion of the example process 600 for operating the EDR module 354 shown in FIG. 3, in accordance with some embodiments. Step 2005 continues from step 1625 shown in FIG. 16 which initialized quarantine recovery for a file or process. At step 2005, the identified file is restored (i.e., decompressed and unencrypted and then moved) to that file's original location in the user device file system and that file's original permissions are restored. At step 2010, the event is logged by the EDR module 354 and/or reported to the management platform 110.

Figure 21:
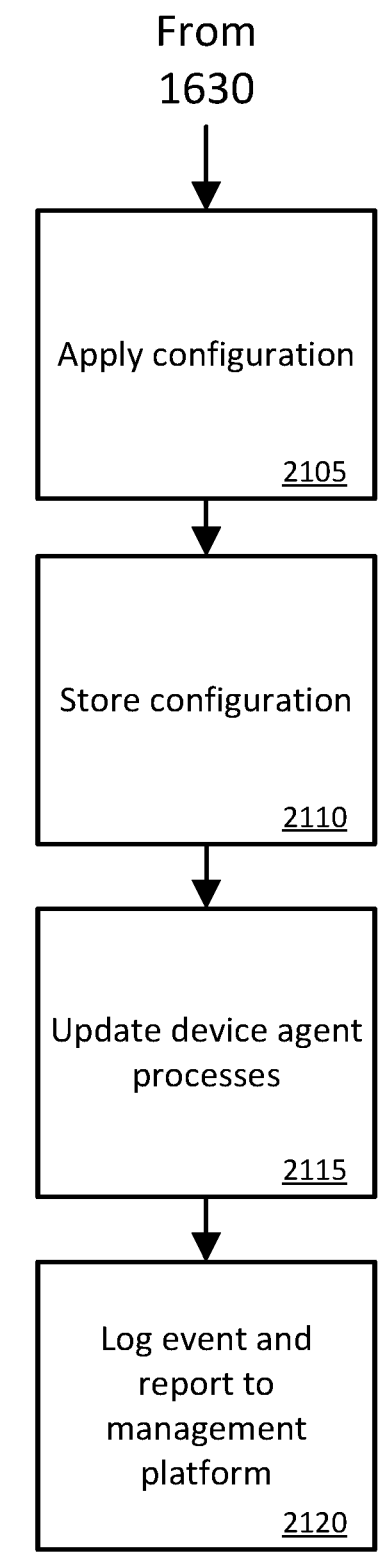

FIG. 21 shows a simplified portion of the example process 600 for operating the EDR module 354 shown in FIG. 3, in accordance with some embodiments. Step 2105 continues from step 1630 shown in FIG. 16 which initialized a configuration update for the EDR module 354. At step 2105, configuration updates (e.g., received from the management platform 110) are applied to the EDR module 354. Such updates may include updates to rules, scheduling updates, lists of blocked/allowed files and applications, logging and reporting preferences, and so on. At step 2110, the received configuration updates are stored by the EDR module 354. At step 2115, any other device agent processes are updated as specified by the received configuration data. At step 2120, the event is logged by the EDR module 354 and/or reported to the management platform 110.

As was mentioned with reference to FIG. 10, as part of initializing file scanning by the EDR module 354, each file to be scanned is associated with an event tracer tree of a tracer module to detect and correct potential file system race conditions at the user device 226*a*. An example event tracer tree is shown and described with reference to FIG. 26. During race conditions at the user device 226*a*, a renamed directory may result in batches of files awaiting hashes, etc. to suddenly change locations. New events are generated and sent to the event tracer module and stored as event nodes in an event tracer tree. Before executing data collection tasks, the tracer module checks to see if there are additional data points that need to be collected in order to satisfy an older/parent event. New, additional events may be generated for the event tracer module to handle, such as if a renamed directory impacts many ancestors.

Figure 22:
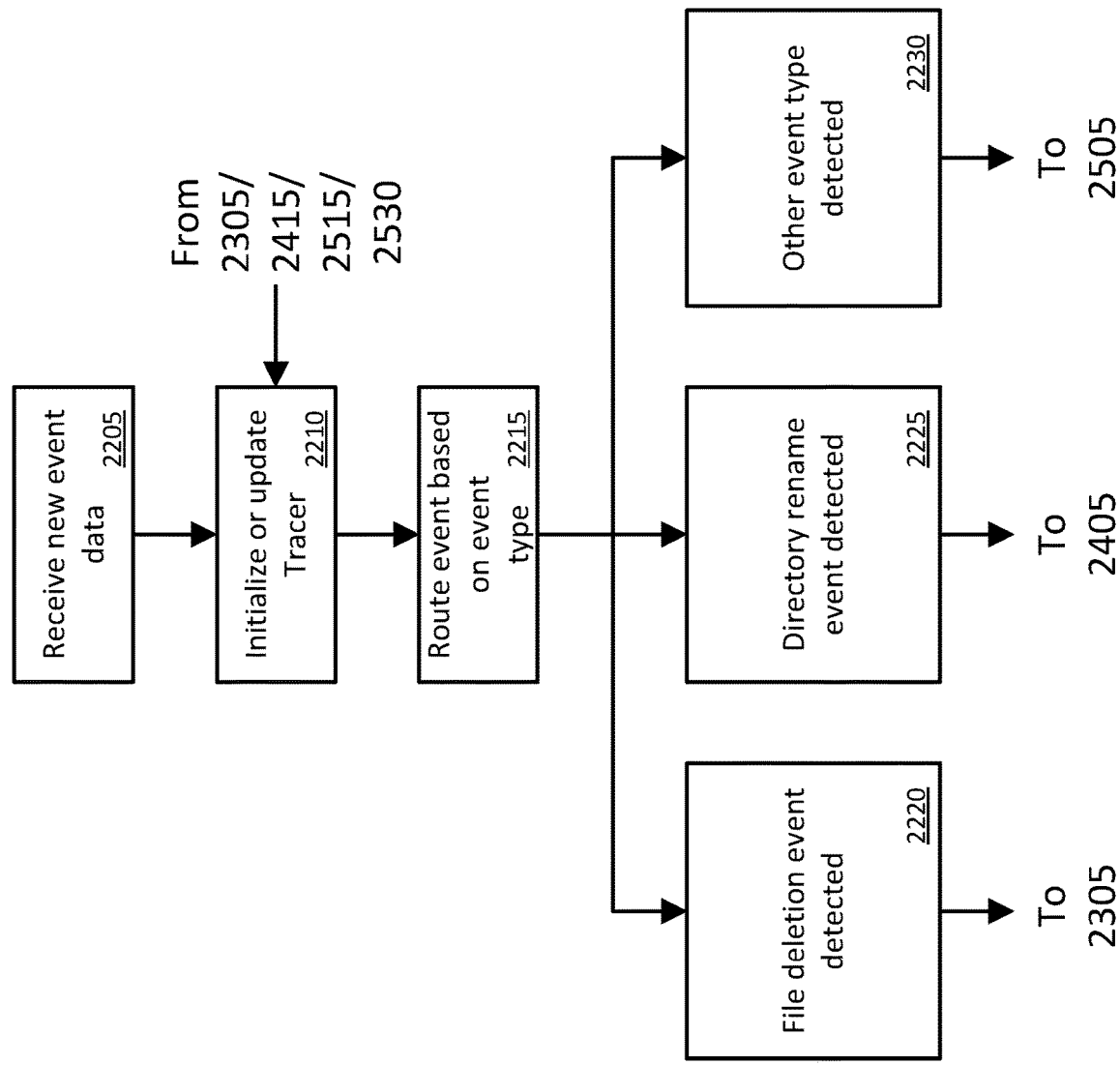

FIG. 22 provides additional details for step 1015 shown in FIG. 10 for generating and using an event tracer tree, in accordance with some embodiments. An event tracer tree as disclosed herein enables the EDR module 354 to "keep track" of a file while the EDR module 354 is processing the file despite changes to the file's name and/or location within a file system of the user device 226*a*. For example, if a file were to change name and/or be moved to another file system directory while the EDR module 354 is generating a hash value for the file, the event tracer tree advantageously allows the EDR module 354 to not only track the changes made to the file but to also continue generating the hash value for the file without interruption. Similarly, if the EDR module 354 determines that a particular file should be deleted, quarantined, or restored from quarantine, the event tracer tree advantageously enables the EDR module 354 to perform such actions regardless of changes to the files name and/or location of the file within a file system of the user device 226*a*. Thus, in some embodiments, the event tracer tree communicates changes made to a file of interest to other modules (e.g., and other steps of the process 600) of the EDR module 354 as the event tracer tree identifies such changes.

At step 2205, new event data is received at the event tracer module 458 of the EDR module 354. At step 2210, the event tracer module is initialized or updated. During initialization, the event tracer module may create an event tracer tree root node (e.g., the node 2605 shown in FIG. 26). During updates, the event tracer may update one or more nodes of the event tracer tree.

At step 2215, an event is routed to an appropriate event handler by the event tracer module based on a determined event type. If it is determined at step 2220 that the received event is a file deletion event, flow continues to step 2305 shown in FIG. 23. If it is determined at step 2225 that the received event is a directory rename event, flow continues to step 2405 shown in FIG. 24. If it is determined at step 2230 that the received event is not a file deletion or directory rename event, flow continues to step 2505 shown in FIG. 25.

Figure 23:
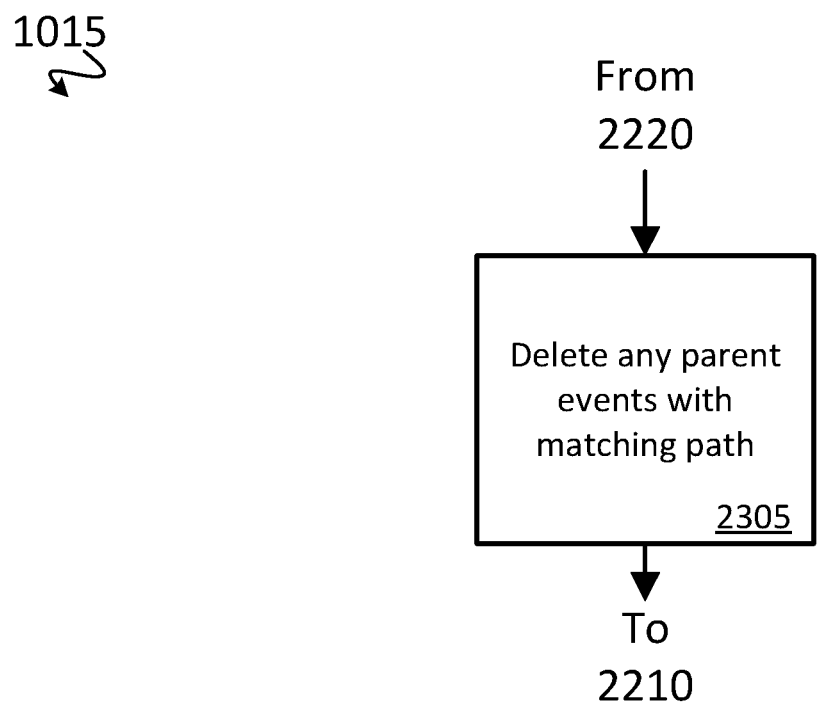

FIG. 23 provides additional details for step 1015 shown in FIG. 10, in accordance with some embodiments. Step 2305 continues from step 2220, shown in FIG. 22, in which it was determined that a file deletion event was detected. At step 2305, any parent event nodes of the event tracer tree that have a matching path are deleted from the event tracer tree. The process flow then returns to step 2210 of FIG. 22.

Figure 24:
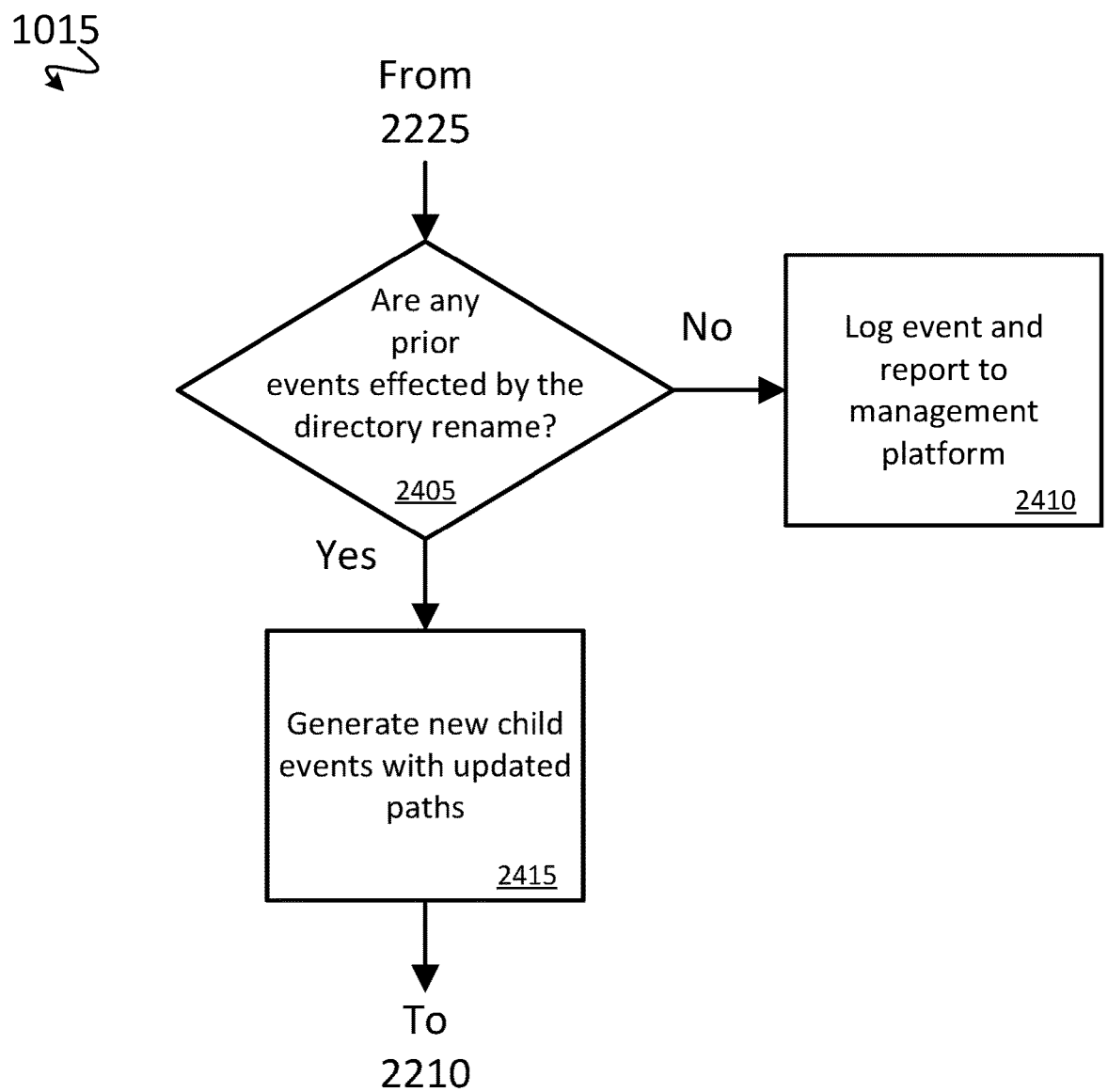

FIG. 24 provides additional details for step 1015 shown in FIG. 10, in accordance with some embodiments. Step 2405 continues from step 2225, shown in FIG. 22, in which it was determined that a directory rename event was detected. At step 2405 it is determined if any prior event nodes in the event tracer tree are impacted by the directory rename. If it is determined that no prior event nodes in the event tracer tree are impacted by the directory rename, flow continues to step 2410. At step 2410, the event is logged by the EDR module 354 and/or reported to the management platform 110. If it was determined at step 2405 that one or more prior events in the event tracer tree are impacted by the directory rename, the process flow continues to step 2415. At step 2415, new child event nodes of the event tracer tree are generated having updated paths. The process flow then returns to step 2210 of FIG. 22.

Figure 25:
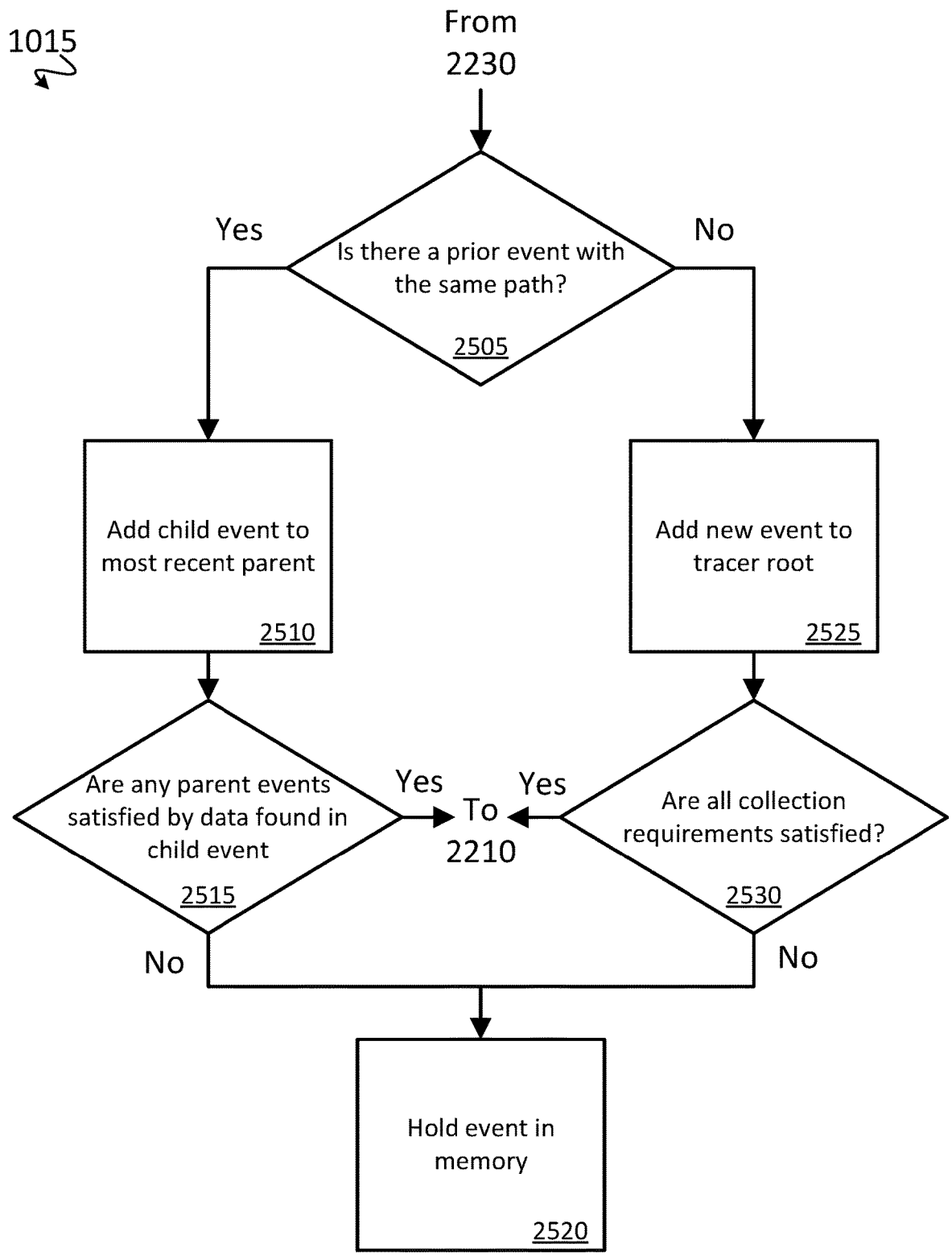

FIG. 25 provides additional details for step 1015 shown in FIG. 10, in accordance with some embodiments. Step 2505 continues from step 2230, shown in FIG. 22, in which it was determined that another event other than a file deletion or directory rename was detected. At step 2505 it is determined if there is a prior event in the event tracer tree having the same path. If it is determined at step 2505 that there is a prior event node in the event tracer tree having the same path, flow continues to step 2510. At step 2510, a child event node is added to the most recent parent node of the event tracer tree. At step 2515, it is determined if there are any parent event nodes in the event tracer tree that are satisfied by the data found in the child event tracer tree. If it is determined at step 2515 that there is at least one parent event node in the event tracer tree that is satisfied by the data found in the child event node, flow of the process returns to step 2210 shown in FIG. 22. Otherwise, flow continues to step 2520. At step 2520, the child event is retained in memory.

If it was determined at step 2505 that there is not a prior event with the same path, flow of the process continues to step 2525. At step 2525 a new parent event is added to the event tracer tree root. At step 2530 it is determined if all collection requirements are satisfied. If it is determined at step 2530 that all collection requirements are satisfied, flow of the process returns to step 2210 shown in FIG. 22. Otherwise, flow of the process continues to step 2520. At step 2520, the new event is retained in memory for post-processing or processing at other steps of the process 600.

Figure 26:
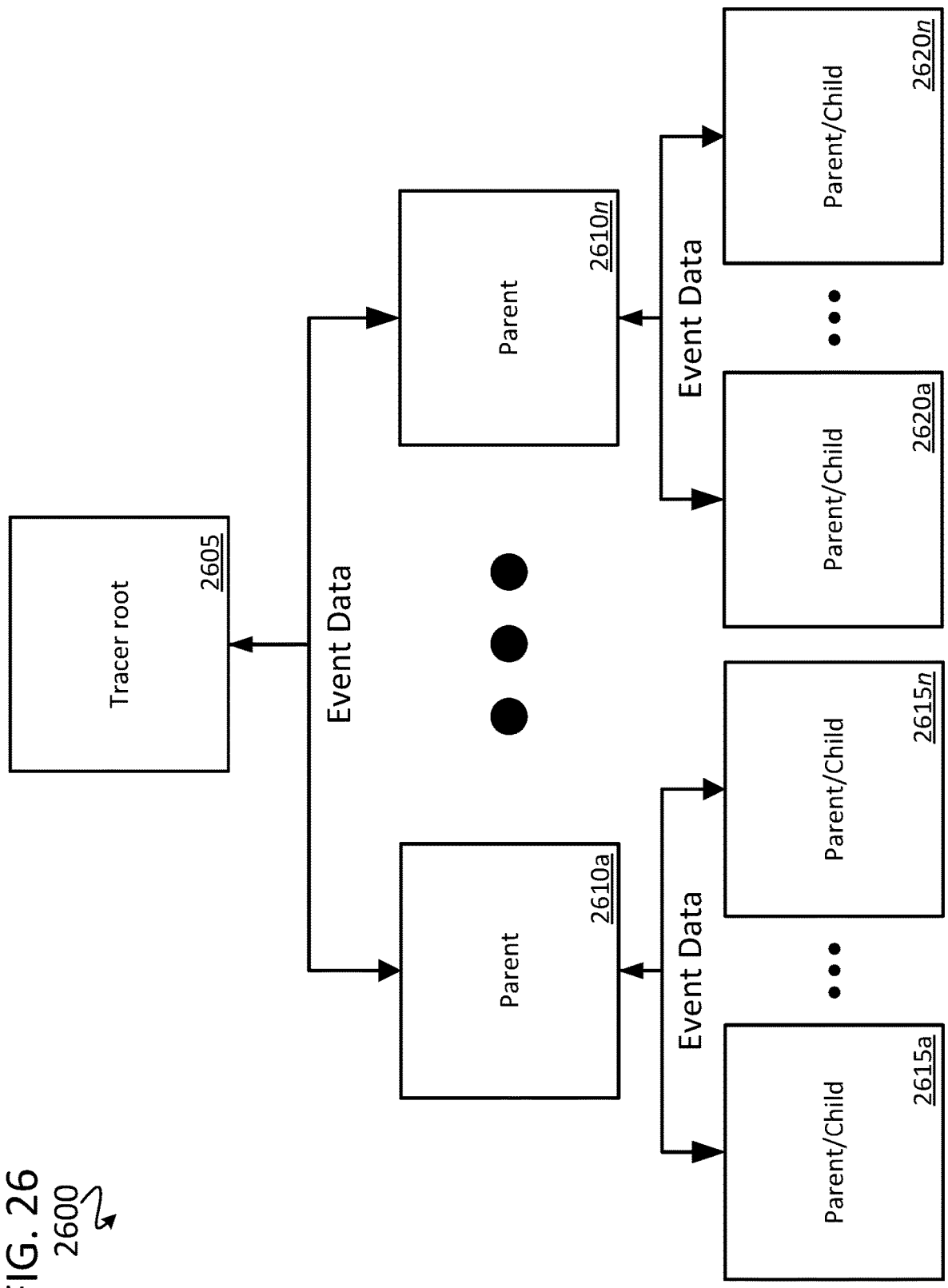
FIG. 26 shows a simplified representation of an event tracer tree, in accordance with some embodiments.

FIG. 26 provides a simplified example of an event tracer tree 2600, in accordance with some embodiments. The event tracer tree includes a tracer root node 2605, and parent nodes 2610*a-n*, each of which includes parent/child nodes 2615*a-n* and 2620*a-n*, respectively. Each of the parent/child nodes 2615*a-n* and 2620*a-n* may include additional parent/child nodes (not shown). The nodes of the event tracer tree are advantageously operable to exchange event data between themselves in order to resolve file system and process discrepancies caused by files being moved, renamed, or deleted. For example, if one or more parent events are awaiting additional data collection requirements (such as a file hash that could not be obtained because the file was moved), and a child event contains the required data, the tracer module automatically satisfies the requirement by transferring data between event nodes by a key path. Once all data collection requirements are satisfied, the event data is logged and/or reported to the management platform 110, and the associated event nodes are removed from the event tracer tree 2600. Events are held in the event tracer tree until either the data collection requirements for it and all ancestors are satisfied, or the event has been in the event tracer tree for an extended period of time (e.g., more than one minute) and is no longer needed to handle conditions.

Figure 27:
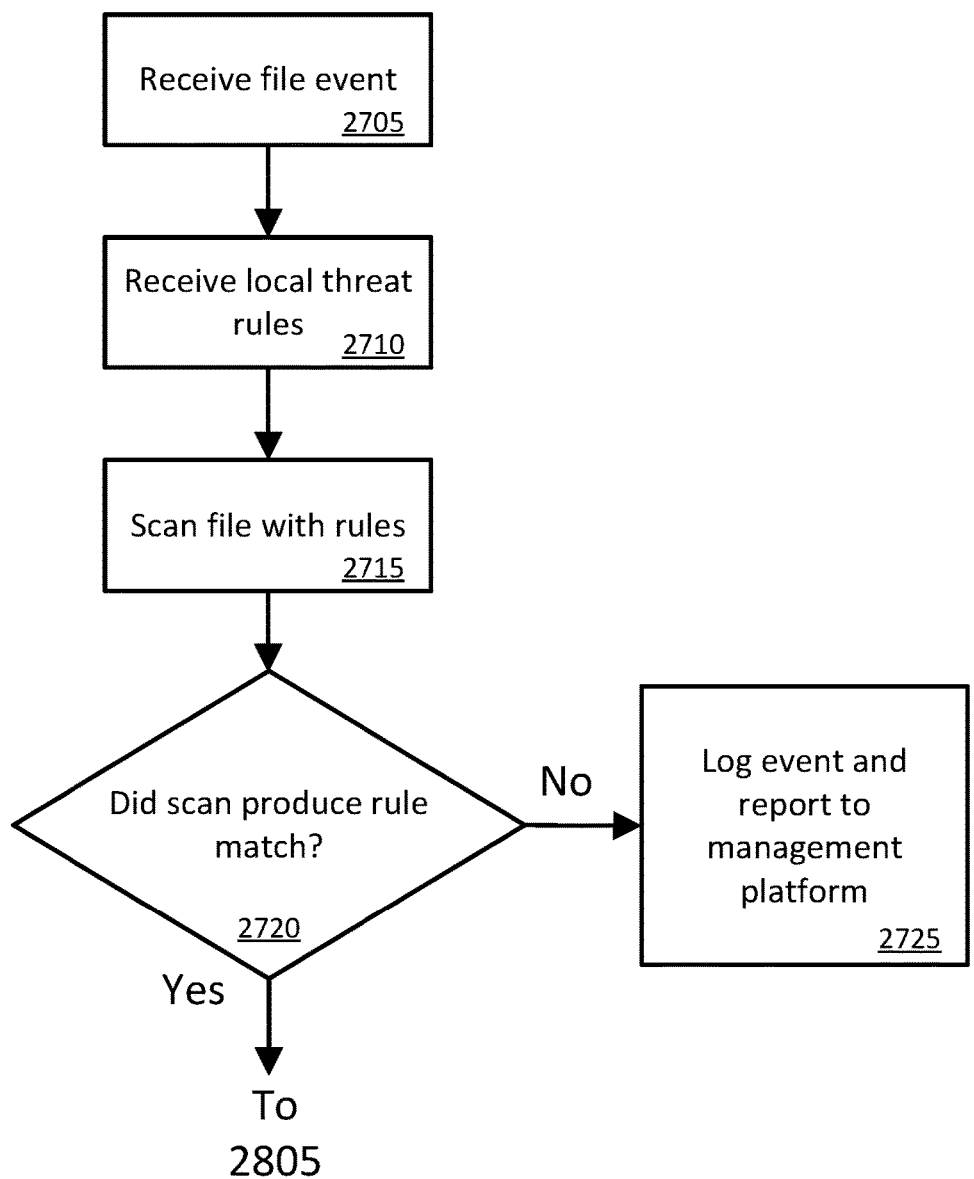
FIGS. 27-29 show simplified portions of a process for user device agent event detection and recovery using the EDR module shown in FIG. 3, in accordance with some embodiments.

FIG. 27 provides additional details for offline operation of the EDR module 354 at step 1510 shown in FIG. 15, in accordance with some embodiments. Offline mode is enabled when the device agent cannot communicate with the management platform 110. This may be because the user device 226*a* has no internet access, or the management platform service may be interrupted. At step 2705, an offline scanning module of the EDR module 354 (not shown) receives a file event (e.g., from another module of the EDR module 354). At step 2710, the offline scanning module receives locally stored threat rules (e.g., from the system configuration database 364). At step 2715, the offline scanning module scans the file identified by the received file event in accordance with the locally stored threat rules. At step 2720, it is determined if the file scan produced results matching any of the rules. If the file scan does not produce results matching any of the rules, flow continues to step 2725 where the event is logged locally by the EDR module 354 and/or is queued to be reported to the management platform 110 when offline operation ends. If it was determined at step 2720 that the file scan produced results matching one or more rules, flow continues to step 2805 shown in FIG. 28.

Figure 28:
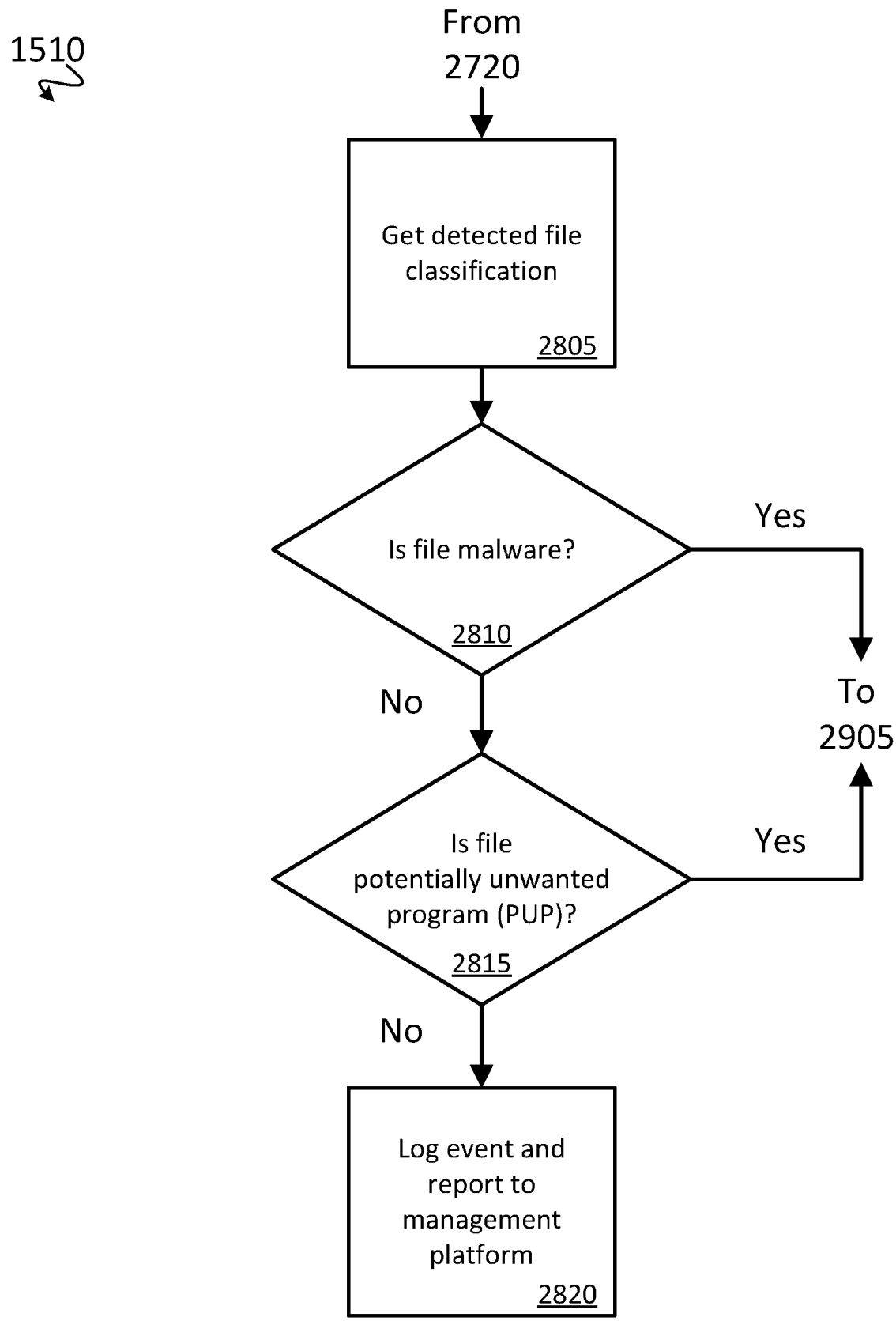

FIG. 28 provides additional details for offline operation of the EDR module 354 at step 1510 shown in FIG. 15, in accordance with some embodiments. Step 2805 continues from step 2720 shown in FIG. 27. At step 2805, a classification of the scanned file is determined by the offline scanning module. At step 2810 it is determined if the classification indicates that the file is malware. If the file is not determined to be malware, flow continues to step 2815. At step 2815 it is determined if the classification indicates that the file is a potentially unwanted program (PUP) (i.e., it is not malware, but it is a program that should not be installed at the user device 226*a* according to configuration settings set at the management platform 110). If it is determined at step 2815 that the file is not a PUP, flow continues to step 2820. At step 2820, the event is logged locally by the EDR module 354 and/or queued to be reported to the management platform 110 when the offline operation ends. If it was determined at step 2810 that the file is malware, or if it was determined at step 2815 that the file is a PUP, flow continues to step 2905 shown in FIG. 29.

Figure 29:
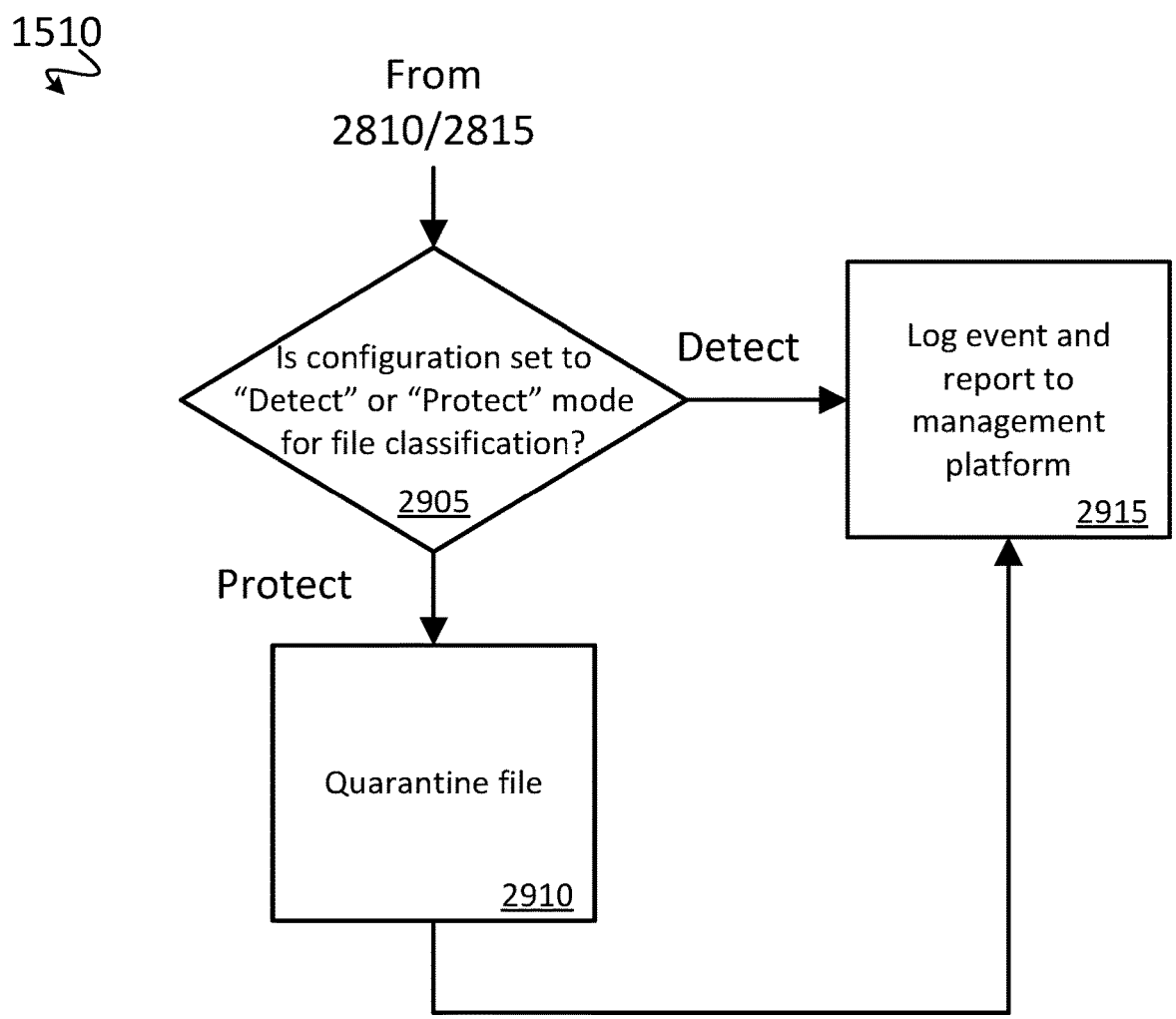

FIG. 29 provides additional details for offline operation of the EDR module 354 at step 1510 shown in FIG. 15, in accordance with some embodiments. Step 2905 continues from steps 2810 or 2815 shown in FIG. 28. At step 2905 it is determined by the offline scanning module if configuration settings of the EDR module 354 (i.e., as specified by the management platform 110) stipulate whether malware files and PUP files should merely be detected ("Detect") or if remediation actions should be taken ("Protect"). If it is determined at step 2905 that remediation actions should not be taken (i.e., "Detect"), flow continues to step 2915. If it is determined at step 2905 that remediation actions should be taken, flow continues to step 2910. At step 2910, the detected file is quarantined, as described above with reference to FIG. 18. Flow then continues to step 2915. At step 2915, the event is logged locally by the EDR module 354 and/or queued to be reported to the management platform 110 when the offline operation ends.

Notifications reported to the management platform 110 about matching threat rules include an identification of the matched rule, a classification type and subtype (e.g., type of malware or PUP, subtype of Adware, Ransomware, etc.), a rule version, a file path, a file hash, a timestamp, and/or an event UUID. Notifications reported to the management platform 110 about file events include a file path, a file hash, a file type, an identifier, user, and group information for a responsible process, a download URL if the file was downloaded using a browser, a time stamp, and/or event-type specific data such as new ownership information for a file owner change event, or a new file path for a file rename event.

FIG. 30 illustrates an example compute node 3000 which could be used as a hardware platform for implementing all or a portion of each of the management platform 110, the administrator device 224, and/or the user devices 226*a-n*, in accordance with some embodiments. The compute node 3000 generally includes one or more CPUs 3002, a memory module 3004 (e.g., RAM), a non-volatile data storage module 3006 (e.g., a hard drive/disk drive or array of hard drives/disk drives), a network I/O module 3008 (e.g., a network interface card (NIC) and/or a top-of-rack interface), and other modules 3010 such as user I/O, wireless communication modules, optical communication modules, system diagnostic or monitoring modules, or other modules. The CPUs 3002 are operable to perform processes in association with the memory module 3004 and the non-volatile data storage module 3006. In some embodiments, one or more compute nodes 3000 are configured to perform all or a portion of the process 600 disclosed herein. In such embodiments, the memory module 3004 and the non-volatile data storage module 3006 may include all or a portion of the programs and data required by the CPUs 3002 to perform the process 600 disclosed herein.

Reference has been made in detail to embodiments of the disclosed invention, one or more examples of which have been illustrated in the accompanying figures. Each example has been provided by way of an explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
   receiving, from a remote management platform, a plurality of security rules at an endpoint detection and response (EDR) module at a user device;
   subscribing, by the EDR module, to one or more event types at the user device;
   receiving, at the EDR module, a notification of an event corresponding to one of the subscribed event types;
   upon determining, by the EDR module, that the event is associated with a file stored at the user device, instantiating, by an event tracer module, an event tracer tree that is associated with the file;
   identifying, by the EDR module, a plurality of files in a file system at the user device to be scanned;
   for each identified file, instantiating, by the EDR module, a respective sequential file reading thread;
   upon receiving file data from each associated sequential file reading thread by a plurality of hash function threads at the EDR module, generating a plurality of file hash values by calculating a plurality of hash functions concurrently for each sequential file reading thread;
   generating, by the EDR module, a file hash value of the plurality of file hash values for the file using the event tracer tree;
   upon determining, by the EDR module, that the file hash value satisfies a security rule, quarantining the file; and
   reporting to a management platform that the file has been quarantined.

2. The method of claim 1, further comprising:
   generating, by the event tracer module, an event tracer tree root node that is associated with the file;
   receiving, by the event tracer module, new event data associated with the file, the new event data being associated with a file system event at the user device;
   routing, by the event tracer module, the new event data to an event handler based on a determined event type of the new event data, wherein the determined event type indicates that a change has been made to the file;
   generating, by the event tracer module, a new node in the event tracer tree based on the new event data; and
   resolving, by the event tracer module, a file system discrepancy at the user device using the event tracer tree, the file system discrepancy having been caused by the file system event.

3. The method of claim 2, wherein generating a file hash value for the file using the event tracer tree comprises:
   resolving, by the event tracer module, the file system discrepancy while a file hash process is generating the file hash value.

4. The method of claim 1, wherein:
   the file hash value is generated by a file hash process that is associated with a parent node of the event tracer tree;
   a first child node of the event tracer tree is associated with the file for a first location of the file in the file system at the user device;
   a second child node of the event tracer tree is associated with the file in a second location in the file system at the user device after the file has been moved from the first location to the second location; and
   the method further comprises:
   upon determining, by the event tracer tree, that the file hash process is awaiting additional data from the file, receiving the additional data from the file, using the event tracer tree and the second child node.

5. The method of claim 1, wherein:
   each sequential file reading thread buffers in respective file data asynchronously from an associated hash function thread of the plurality of hash function threads.

6. The method of claim 1, further comprising:
   determining, by the EDR module, if the user device is offline; and
   upon determining, by the EDR module, that the user device is offline, performing a rule-based local storage scan using the plurality of file hash values.

7. The method of claim 1, wherein:
   each sequential file reading thread is instantiated by the EDR module as a low-priority thread.

8. The method of claim 1, wherein quarantining the file comprises:
   encrypting, by the EDR module, the file; and
   storing, by the EDR module, the encrypted file in a quarantine file system directory at the user device.

9. The method of claim 1, further comprising:
   providing, by the management platform, a user interface to an administrator device that is remote from the management platform and the user device, the user interface providing a plurality of configuration setting options; and
   receiving, by the user interface, an indication of a selected configuration setting of the plurality of configuration setting options;
   wherein the plurality of security rules are identified, at the EDR module, based on the selected configuration setting.

10. The method of claim 1, further comprising:
    subscribing, by the EDR module, to another event type at the user device;
    receiving, at the EDR module, another notification corresponding to the other subscribed event type;
    upon determining, by the EDR module, that the event is associated with a process, determining, by the EDR module, that the process satisfies another security rule of the plurality of security rules;
    upon determining, by the EDR module, that the process satisfies the other security rule, preventing the process from executing at the user device; and reporting to the remote management platform that the execution of the process has been prevented.

11. A method, comprising:

subscribing, by an endpoint detection and response (EDR) module at a user device, to one or more events at the user device;

receiving, at the EDR module at the user device, a notification of an event at the user device;

upon determining, by the EDR module, that the event is associated with a file stored at the user device, instantiating, by an event tracer module, an event tracer tree that is associated with the file;

generating, by the event tracer module, an event tracer tree root node that is associated with the file;

receiving, by the event tracer module, new event data associated with the file, the new event data being associated with a file system event at the user device;

routing, by the event tracer module, the new event data to an event handler based on a determined event type of the new event data, wherein the determined event type indicates that a change has been made to the file;

generating, by the event tracer module, a new node in the event tracer tree based on the new event data;

resolving, by the event tracer module, a file system discrepancy at the user device using the event tracer tree, the file system discrepancy having been caused by the file system event;

generating, by the EDR module, a file hash value for the file using the event tracer tree; and upon determining, by the EDR module, that the file hash value satisfies a security rule received from a remote management platform, quarantining the file.

12. The method of claim 11, wherein generating a file hash value for the file using the event tracer tree comprises:

resolving, by the event tracer module, the file system discrepancy while a file hash process is generating the file hash.

13. The method of claim 11, wherein:

the file hash value is generated by a file hash process that is associated with a parent node of the event tracer tree;

a first child node of the event tracer tree is associated with the file at a first location of the file of a file system at the user device;

a second child node of the event tracer tree is associated with the file in a second location in the file system after the file has been moved from the first location to the second location; and the method further comprises:

upon determining, by the event tracer tree, that the file hash process is awaiting additional data from the file, receiving the additional data from the file, using the event tracer tree and the second child node.

14. The method of claim 11, further comprising:

identifying, by the EDR module, a plurality of files in a file system of the user device to be scanned;

for each identified file, instantiating, by the EDR module, a respective sequential file reading thread; and upon receiving file data from each associated sequential file reading thread by a plurality of hash functions at the EDR module, generating a plurality of file hash values by calculating a plurality of hash functions concurrently for each sequential file reading thread.

15. The method of claim 14, wherein:

each sequential file reading thread buffers in file data asynchronously from an associated hash function thread.

16. The method of claim 14, wherein:

each sequential file reading thread is instantiated by the EDR module as a low-priority thread.

17. The method of claim 11, wherein quarantining the file comprises:

encrypting, by the EDR module, the file; and storing, by the EDR module, the encrypted file in a quarantine file system directory at the user device.

18. The method of claim 11, further comprising:

subscribing, by the EDR module, to another event type at the user device;

receiving, at the EDR module, another notification corresponding to the other subscribed event type;

upon determining, by the EDR module, that the event is associated with a process, determining, by the EDR module, that the process satisfies another security rule;

upon determining, by the EDR module, that the process satisfies the other security rule, preventing the process from executing at the user device; and reporting to a management platform that the execution of the process has been prevented.

* * * * *